US005829948A

United States Patent [19]

Becklund

[11] Patent Number: 5,829,948

[45] Date of Patent: Nov. 3, 1998

[54] MULTIPURPOSE LIFT APPARATUS AND METHOD

[75] Inventor: Harold Becklund, Tacoma, Wash.

[73] Assignee: Susanne Becklund, Adminstratix, Tacoma, Wash.

[21] Appl. No.: 548,902

[22] Filed: Oct. 26, 1995

[51] Int. Cl.[6] .......... B60P 1/00

[52] U.S. Cl. .......... 414/607; 414/495; 414/785; 414/814; 187/269; 187/237; 254/8 R

[58] Field of Search .......... 414/800, 814, 414/607, 608, 495, 785, 589; 187/211, 222, 233, 234, 237, 269, 272, 274; 254/8 R, 9 R, 2 C, 17; 269/17

[56] References Cited

U.S. PATENT DOCUMENTS

| | | | |
|---|---|---|---|
| 2,050,000 | 8/1936 | Frost | 254/2 |
| 2,614,800 | 10/1952 | Garlinger et al. | 254/2 |
| 2,804,218 | 8/1957 | Sylvester et al. | 414/602 X |

(List continued on next page.)

FOREIGN PATENT DOCUMENTS

| | | | |
|---|---|---|---|
| 821360 | 8/1969 | Canada | 414/607 |
| 2461629 | 3/1981 | France | 414/495 |
| 6407386 | 12/1965 | Netherlands | 414/607 |
| 1163475 | 9/1969 | United Kingdom | 414/495 |
| 2135963 | 9/1984 | United Kingdom | 414/607 |
| 9412314 | 6/1994 | WIPO | 414/607 |

OTHER PUBLICATIONS

Advance Lifts, Inc., mail–in card, "Action Lift Tables", *MMH* Aug. 1995.

Advance Lifts, Inc., mail–in card, "Add Saftey, Speed and Versatility to your Loading Dock Operation" *IEN* Apr. 1995.

Advances Lifts, Inc., advertisement, "Every Dock Needs a Lift".

Advertisement, "1811 Hydraulic Loading Dock Surface Mounted".

Air Technical Industries, advertisement, "Ergonomically Speaking . . . ATI's Zero–Low Scissor Lift Tables & Tilt Tables . . . Are The Solution!".

Air Technical Industries, advertisement, "Two for the price of one . . . double action lift–and–tilt tables", *IEN* Jul. 1995, p. 67.

Autoquip Corporation, mail–in card, "Ergonomics: Lift–Turn–Tilt–Any Questions?",*MMH* Aug. 1995.

Becklund & Associates, catalog sheet, "ElectroMech".

C&H catalog, "Bar Storage & Transport", p. 59; Conveyor Systems, p. 228; Steel Panel Trucks, p. 243; Platform Trucks, p. 246; Manual & Battery–Powered Lift Trucks, p. 259; Mobile Ergonomic Levelers & Tilt Tables, p. 263; Lift Tables, p. 267; Drum Handlers, p. 279.

"Fastening and Joining Techniques and Hardware", pp. 516–517.

Globe International, catalog sheet, "Lift Tables".

Handling Specialty Mfg. Ltd., advertisement; "For high places in little spaces".

Interthor Inc., mail–in card, "Back Injury Ergonomically Reduced!", *IEN* Sep. 1994.

Interthor Inc., mail–in–card, "Back Injury Down! With Interthor Low Cost Portable Ergonomic Work Positioners", *MMH* Aug. 1995.

(List continued on next page.)

*Primary Examiner*—Frank E. Werner

*Attorney, Agent, or Firm*—Sheridan Ross P.C.

[57] ABSTRACT

A lift table modified to permit user configuration to achieve a plurality of functions is provided. The lift table may be configured for any of these functions by the end user, without the use of special tools or training. In one embodiment the lift table is provided with coupling devices such as pockets, flanges, brackets, etc. which can be coupled to a plurality of standard sized or spaced attachments for multiple purposes such as pallet forklift, tilt/layover, conveyor, turntable and the like.

25 Claims, 15 Drawing Sheets

U.S. PATENT DOCUMENTS

| | | | |
|---|---|---|---|
| 3,045,847 | 7/1962 | Fisher . | |
| 3,176,858 | 4/1965 | Johnson . | |
| 3,282,566 | 11/1966 | Clarke | 254/122 |
| 3,325,023 | 6/1967 | Coleman . | |
| 3,727,773 | 4/1973 | Wolfe, Jr. . | |
| 3,822,023 | 7/1974 | Cordel | 214/1 SW |
| 3,944,083 | 3/1976 | Fisher et al. | 214/1 D |
| 4,005,793 | 2/1977 | Smith | 414/607 |
| 4,050,599 | 9/1977 | Bender | 414/785 X |
| 4,219,186 | 8/1980 | Brewer | 254/9 C |
| 4,288,195 | 9/1981 | Brewer | 414/608 |
| 4,331,324 | 5/1982 | Andary | 254/2 R |
| 4,403,680 | 9/1983 | Hillesheimer | 187/269 X |
| 4,421,209 | 12/1983 | Vermette et al. | 187/9 R |
| 4,488,326 | 12/1984 | Cherry | 414/495 X |
| 4,491,449 | 1/1985 | Hawkins | 414/495 X |
| 4,511,110 | 4/1985 | Möller | 248/421 |
| 4,708,576 | 11/1987 | Conley | 414/607 |
| 4,726,724 | 2/1988 | Jenkner | 414/119 |
| 4,765,487 | 8/1988 | Bliss | 209/510 |
| 4,884,454 | 12/1989 | Johnson | 73/788 |
| 5,156,238 | 10/1992 | Matthews . | |
| 5,244,336 | 9/1993 | Engler et al. | 414/642 |

OTHER PUBLICATIONS

Lifting Technologies Inc., advertisement, "We Set the Standards".

Pentalift Equipment Corporation, mail–in card, Lift Tables Unlimited.

Southworth Products Corp., mail–in card, "Floor Height Lift Table", Jun. 1995.

C&H catalog, "Steel Hoppers", p. 72.

C&H catalog, "Drum Lifters & Tilters", p. 291; Froklift Drum Handlers, p. 292; Deluxe Forklift Drum Handlers, p. 293; Drum Handlers, pp. 294–295.

Dozier Equipment International catalog, "Drum Handlers", pp. 48–49, 51; Drum Pouring Units, p. 50; Drum Handling Attachments, p. 52; Horizontal Drum Storage, p. 53; Drum Handling Equipment, p. 54; Drum Stackers, p. 55.

12
16
22a
22b
30
302a
302b
304a
306
308
309
310
312

MULTIPURPOSE LIFT APPARATUS AND METHOD

The present invention relates to an apparatus and method for providing multiple uses in connection with a lift apparatus, in particular to a lift table which is user-configurable for many different purposes.

BACKGROUND INFORMATION

Lift tables are useful for receiving and supporting a load on a substantially flat surface, changing the height of such surface (e.g., by a hydraulic device) and rolling the lift table to a desired location (e.g., using casters). However, when other functions are desired, apparatus configured specifically for such functions typically must be provided. For example, for lifting a load on a pallet, a forklift or a fork jack device may be used, having its own lifting mechanism. When a load-tilting function is desired, a hydraulic or other device dedicated to controlling the angle of tilt is used. Other types of functions similarly have required provision of separate apparatus, often with their own dedicated hydraulic or other motive or controlling device. This imposes an undesirably large cost on users who must acquire separate apparatus for each function.

Some devices can be configured to more than one use. However, in some instances such reconfiguration requires tools and/or skills not typically possessed by the end user, and thus are not user configurable devices, since devices must be configured by trained personnel and/or using specialized tools, thus often requiring the user to transport the apparatus to a service center for the modification. In some cases, no provision is made for assuring that devices are positioned in a useful or standardized position of spacing. In some cases a modification to a lift table or other device to accommodate a further function would be a permanent or non-reversible modification in the sense that the end user cannot readily (i.e., without special training and/or tools) undo or reverse the modification that has been made to the lift table. In some cases various modifications that may be made to the tables are idiosyncratic in the sense that a modification made to accommodate one function cannot be employed for use in achieving another function, so that multiple and separate modifications must be made for multiple separate functions, without reusing fixtures. In some cases, two or more modifications to a lift table may be incompatible with one another in the sense that one modification may make it impossible to later reconfigure the lift table for a different function, at least without extensive repair or other reconfiguration of the lift table to reverse the effects of the first modification. In some cases, it is infeasible to provide two or more modifications to a lift table to permit the lift table to be used for two or more functions. In some cases the modification of lift table would involve adding a motive or control device separate from that used for lifting the table surface, thus adding to the expense of the overall modified device. Furthermore, there are numerous functions which have never been performed, or have been performed only in limited, inefficient or costly manners, using a lift table.

Accordingly, it would be useful to provide a lift table which can be configured for various tasks by the end user (i.e., without needing special tools or training, preferably without the need for any tools, e.g. using readily attachable drop-in or latchable devices) in which various modifications are compatible with one another, and/or in which two or more potential modifications can employ common devices or fixtures on the lift table. In this context, "special" means configured for the attachment or configuration and not normally usable for other purpose. For example an ordinary wrench or screwdriver is not a "special" tool. Preferably such improvements or modifications can be employed efficiently, e.g., by using the table lift drive or control mechanism for achieving some or all of the functions to be performed by the modification. It further would be advantageous to use a lift table to achieve various functions not previously achieved using a lift table device, and/or which have been achieved only in an inefficient, costly or limited fashion.

SUMMARY OF THE INVENTION

According to the present invention, a lift table is configured so that the end user may readily modify the lift table to perform various functions. In one embodiment, pockets or holes and/or brackets or flanges are provided on the lift table and positioned or configured in standard ways to couple to a variety of different devices with standard-spaced couplers, e.g., so that lift tables (at different times) use the same pockets, brackets, flanges, etc. to achieve different functions.

In some cases, a modification results in an apparatus which provides a function that uses both the lift table aspect and the modified or add-on function aspect to provide results superior to the sum of using separate apparatus to perform the two functions. As one example, the lift table may be configured, in one embodiment, for loading or unloading an attached tilt device for positioning and angularly reorienting, all on the same modified lift table, i.e. without the need for transfer of the load from one device to another, and preferably requiring only a single hydraulic device or other drive/control device. As another example, by coupling both a layover device and a turntable, a load can be laid over from vertical to horizontal, then rotated about a vertical axis, e.g. for proper positioning adjacent to a shelf or other desired location but using only a single drive and without the need for transferring between two discrete apparatus. In one embodiment, a mid-load pivoting tilt/layover attachment can achieve angles of tilt not previously obtainable without additional hydraulic cylinders or other drive/control devices.

DETAILED DESCRIPTION OF THE PREFERRED EMBODIMENTS

Figure 2:
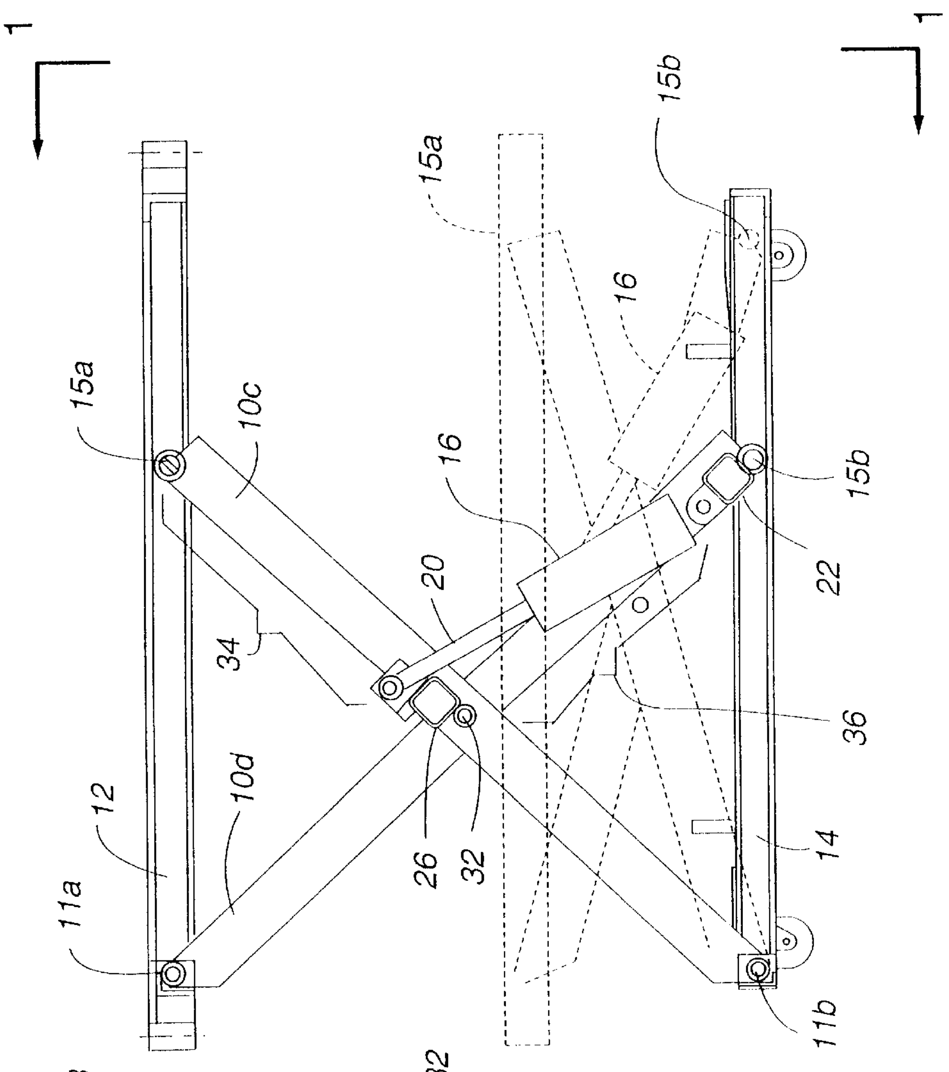
FIG. 2 is a cross-section view taken along line 2—2 of FIG. 1.
Figure 1:
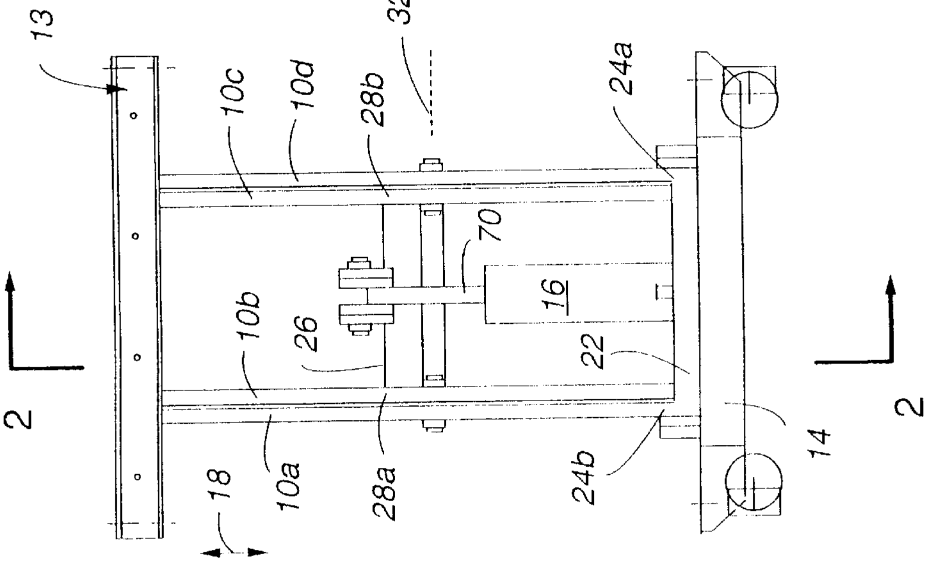
FIG. 1 is an end elevational view of a lift table according to a previous design.
Figures 3A, 3B, 3D:
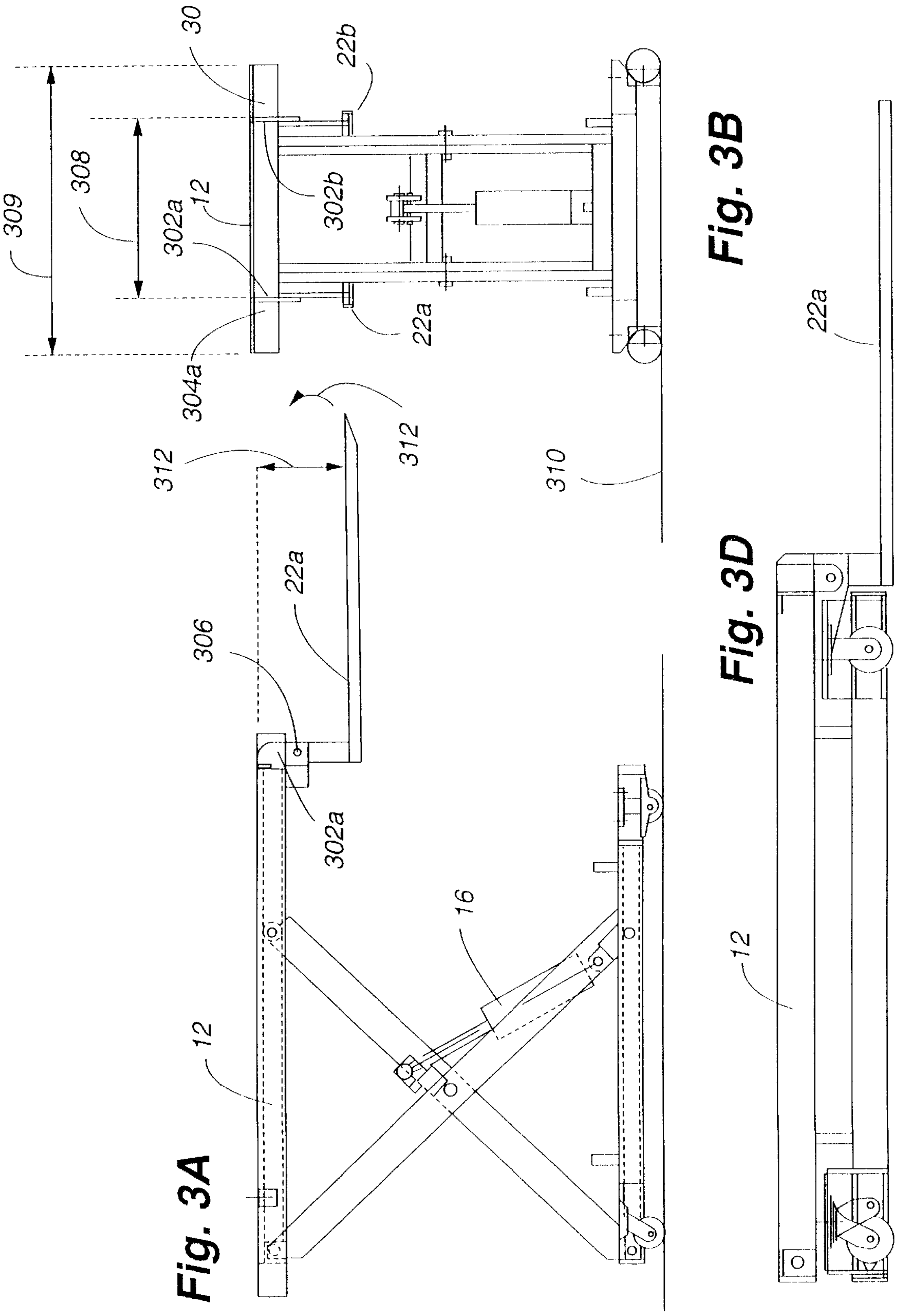
FIGS. 3A, 3B and 3C are side, end elevational and partial exploded perspective views of an improved lift table device according to an embodiment of the present invention.
FIG. 3D is a side view of the embodiment of FIG. 3A, showing the device in a lowered position.
Figure 4C:
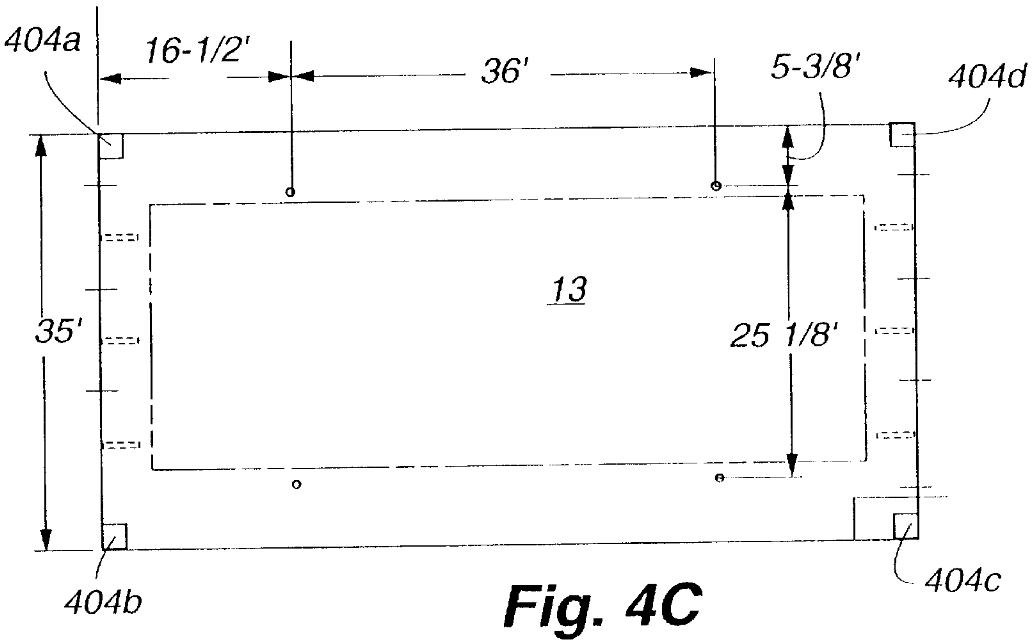
FIG. 4C is a top plan view of an improved lift table according to an embodiment of the present invention.

FIGS. 1 and 2 depict a scissors-type hydraulically-driven lift table. Two pairs of scissor legs 10*a*, 10*b*, 10*c*, 10*d*, are mounted at a first end, e.g., using pivots 11*a*, 11*b*, to an upper support and a lower frame 14 The upper support may include an upper frame 12, and/or a flat deck surface 13. In the depicted embodiment, the deck 13 is mounted to the upper frame 12 using mounting clips 304*a*, 304*b* (FIG. 3B). In one embodiment, the upper frame 12 has a width of about two feet (about 60 cm). In one embodiment, the deck has a width 309 of about three feet (90 cm). The opposite ends of the scissor legs are coupled to rollers 15*a*, 15*b*, and, as part of the scissors motion described below, are free to move along horizontal surfaces of the upper frame 12 and lower frame 14. The first pair of legs 10*a*, 10*b* are pivotally coupled, defining a scissors pivot axis 32 and the second pair of legs 10*c*, 10*d* are pivotally coupled at the same axis 32. A drive or motive device such as a hydraulic cylinder or actuator 16, which may be powered by an electric or air driven pump. Energy for the pump may be provided from an on-board battery and/or from an electric power source via a cable (not shown). Optionally, a switch or other control may be provided for extending or retracting the cylinder rod 20. In the depicted embodiment, the cylinder 16 is pivotally coupled at one end to a first cross beam 22, extending between the lower traveling ends 24*a*, 24*b* of the outer scissors legs 10*a*, 10*d*, and pivotally coupled at the opposite end, to a cross beam 26, extending between positions 28*a*, 28*b*, of the inner scissors legs 10*b*, 10*c*, at a location spaced from the leg scissors axis 32. As best seen in FIG. 2, when the hydraulic cylinder 16 is activated to retract the rod 20, the retraction causes the upper portion 34 of one of each pair of arms 10*b*, 10*c*, to be drawn downward toward the lower portion 36, of the other of each pair or arms 10*a*, 10*d*. This causes the arms 10*a*, 10*b*, 10*c*, 10*d* to pivot about axis 32, in a scissors-like fashion, thus lowering the upper frame pivot point 11*a*, and in consequence, the upper frame 12, while the traveling ends of the scissors legs move linearly, by rollers 15*a*, 15*b*, with respect to the upper frame 12, and lower frame 14, e.g. to the position shown in phantom in FIG. 2. Similarly, controlling the drive device 16 to extend the arm 20, raises the upper frame 12.

Figure 3C:
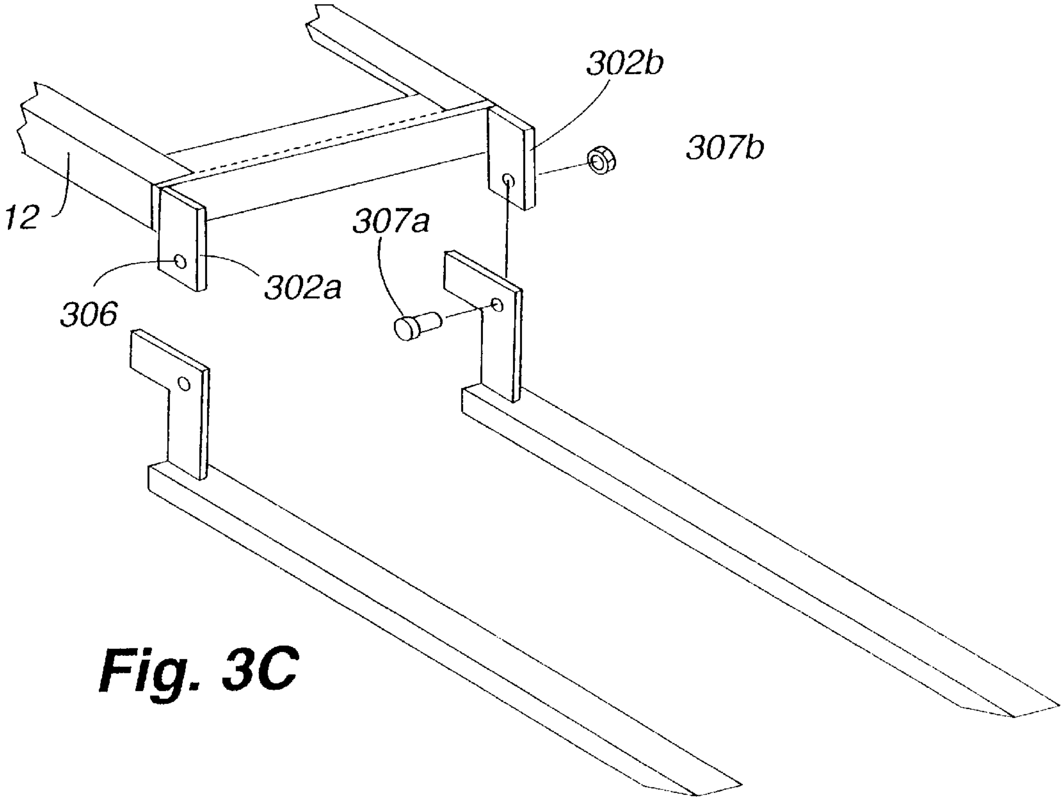
Figure 4B:
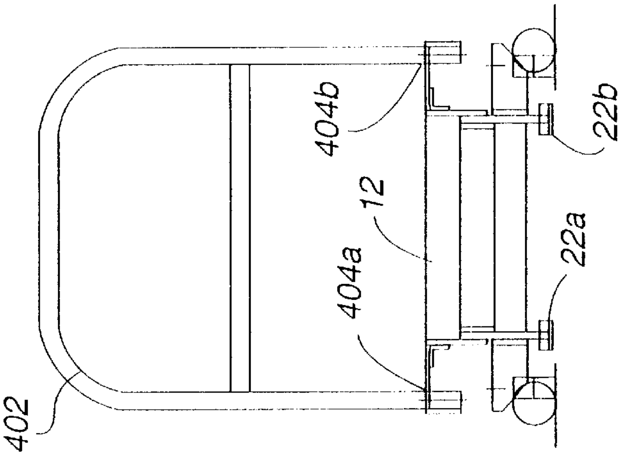
FIGS. 4A and 4B are side and end elevational views of an improved lift table device having a fork lift according to an embodiment of the present invention.
Figure 4A:
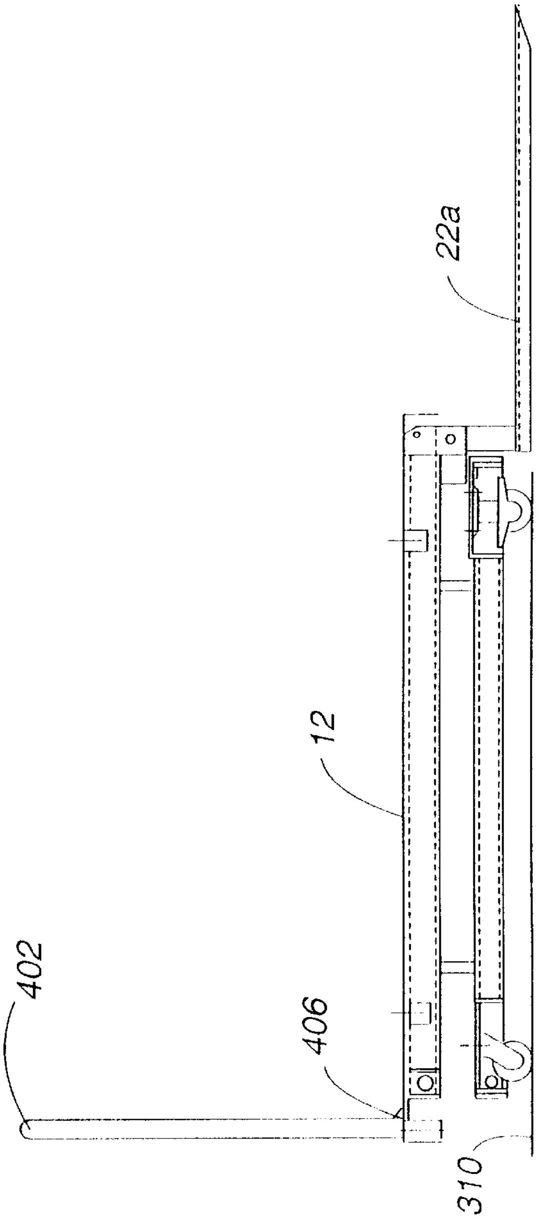

According to an embodiment of the present invention, a lift table is modified to allow it to accept any of a plurality of auxiliary devices including those described below. In the embodiment depicted in FIGS. 3A–3C, a lift table has been provided in a modified fashion to accommodate a user-coupleable attachment, in this case, fork tines 22*a*, 22*b*. A number of sizes and lift capacities of lift tables can be used in this connection. In one embodiment, a lift table having a load capacity of about 2,000 pounds (about 900 kg) and a vertical travel of about 36 inches (about 90 cm) is provided. Preferably, the lift table has a collapsed height sufficient to accommodate a standard hydraulic power package mounted internally. In one embodiment, lift table arm lengths are chosen to accommodate readily-available hydraulic cylinders of standard dimensions and preferably allow lift table fabrication from single 20 foot lengths of material. In one embodiment, the depicted straight flange is replaced with a beveled toe-guard flange, e.g. for pit-mounted installations. Although the depicted embodiment shows a lift table with castors, it is possible to provide the present invention in connection with a lift table which does not have castor wheel assemblies. A number of types of hydraulic cylinders can be used such as those operating at a system pressure of about 2,000 p.s.i. (about 13,000 kPa). Preferably, the lift table lift arms are designed with a 4-to-1 safety factor based on the yield strength of the steel, e.g. to allow for safe handling of non-uniform loads. In the embodiment depicted in FIGS. 3A–3C, the lift table is modified to accommodate the fork tines 22*a*, 22*b* (as well as to accommodate other apparatus, examples of which are described below) by the addition of brackets 302*a*, 302*b*. The brackets 302*a*, 302*b* may be coupled to the upper frame 12, in any of a number of fashions. In the depicted embodiment, they are coupled by welding to the top frame 12. Preferably, the brackets 302*a*, 302*b* are provided with a coupling device such as an eye 306, by which the forks 22*a*, 22*b* may be attached, e.g., using a bolt and nut 307*a*, 307*b*. Other devices for attaching forks to the flanges may be used, such as latches, tracks, hooks and the like. Preferably, the flanges 302*a*, 302*b* are spaced apart a distance 308, configured such that the attached tines 22*a*, 22*b*, will be spaced apart a conventional forklift distance, i.e., a distance configured to engage pallets and the like. In one embodiment, the fork spacing 308 is about 22 to 22.5 inches (about 55 to 57 cm). Preferably, the connection between the flanges 302*a*, 302*b*, and the forks 22*a*, 22*b*, are configured so that, once attached, the forks 22*a*, 22*b*, will be attached to the lift table in a substantially rigid manner, at a constant angle thereto, preferably, substantially parallel to the ground or other support surface 310. A number of types of fork tine configurations are possible. Since the forks are contemplated for attachment by the end user, preferably the forks are relatively light weight such as having a weight of about 30 pounds per tine (about 13 kg). In one embodiment, a substantially hollow tine is formed, e.g. by welding flat steel bar to steel channel. The tines can also be made from solid steel bar such as 1.5 inch by 3 inch steel bar, but in this situation the weight of each tine would double from about 30 pounds to about 60 pounds (from about 13 kg to about 26 kg). If hollow tines are formed by welding flat bar to steel channel, care must be taken to avoid undesirable distortion such as downward bending of the fork tips at the ends. Such distortion may be avoided by using thicker channel and/or using a compensating fixture during welding. The length of the tines is selected according to the intended use and, in one embodiment, has a length of about 40 inches (about 1 meter), e.g. to accommodate a standard 40 inch deep pallet. Preferably, the fork tines are configured to permit lifting of the desired load without tipping the lift table. In one embodiment, a 500 pound (225 kg) load with the load centered 20 inches from the edge of the table frame can be lifted without tipping the lift table. In some embodiments, heavier loads can be accommodated using counter weights such as lifting a load of about 1,000 pounds (about 450 kg) using about 200 pounds (about 90 kg) counter weight placed on the opposite end of the lift table. In the depicted embodiment, the tines 22*a*, 22*b*, are positioned a distance 312 below the level of the frame 12 such as about 10.5 inches (about 26 cm). In one embodiment the distance 312 is selected such that when the scissors lift is lowered to its lowermost configuration as depicted in FIG. 4A, the tines 22*a*, 22*b*, will rest on the support surface 310. This is useful in providing support for the tines 22*a*, 22*b*, while they are being attached to or detached from the lift table. Although, in the depicted embodiment, the tines 22*a*, 22*b*, are attached substantially immovably with respect to the upper frame 12, other configurations are also possible. For example, it is possible to configure the tines 22*a*, 22*b*, so as to be pivotable, or otherwise movable 312, e.g., for temporarily stowing the forks, without removing them.

In the embodiment of FIG. 4A, the lift table is also configured to accommodate attachment of a handle or backstop 402. Preferably, coupling of the back stop is by way of pockets or openings 404*a*, 404*b*, formed in the upper plate 13. Preferably, four or more pockets or openings 404*a*, 404*b*, 404*c*, 404*d*, are provided, such as in each corner of the plate 13, to accommodate a variety of apparatus, examples of which are described below. In one embodiment, the openings or pockets 404*a*, 404*b*, 404*c*, 404*d*, are configured to receive a 1¼ inch (3 cm) pipe stub. The openings 404*a*, 404*b*, 404*c*, 404*d* may each be provided with a floor to support the inserted handle ends 402, and/or limit movement thereof, or the handle ends 402 may be provided with a flange 406 and/or a pipe stop collar for support and limiting vertical movement. If desired the pockets and/or pipe stubs may be provided with a retaining device such as a pin for engaging aligned through holes, latches, hooks, and the like. If desired, the pocket may be configured to receive and maintain an insert in a predetermined rotational attitude such as by including a key or key way, square, polygonal or otherwise including a flat indexing surface and the like. Preferably the pocket opening is large enough to accommodate a standard sized insert such as 1.66 inch (4 cm) outside diameter (o.d.) pipe. In one embodiment, the pockets have a substantially square cross section.

Figure 5B:
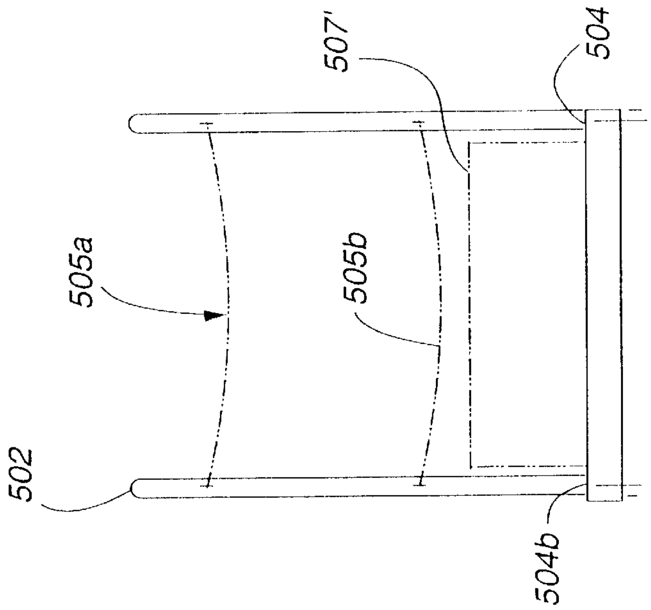
FIGS. 5A and 5B are side and end elevational views of a portable loading dock, according to an embodiment of the present invention.
Figure 5A:
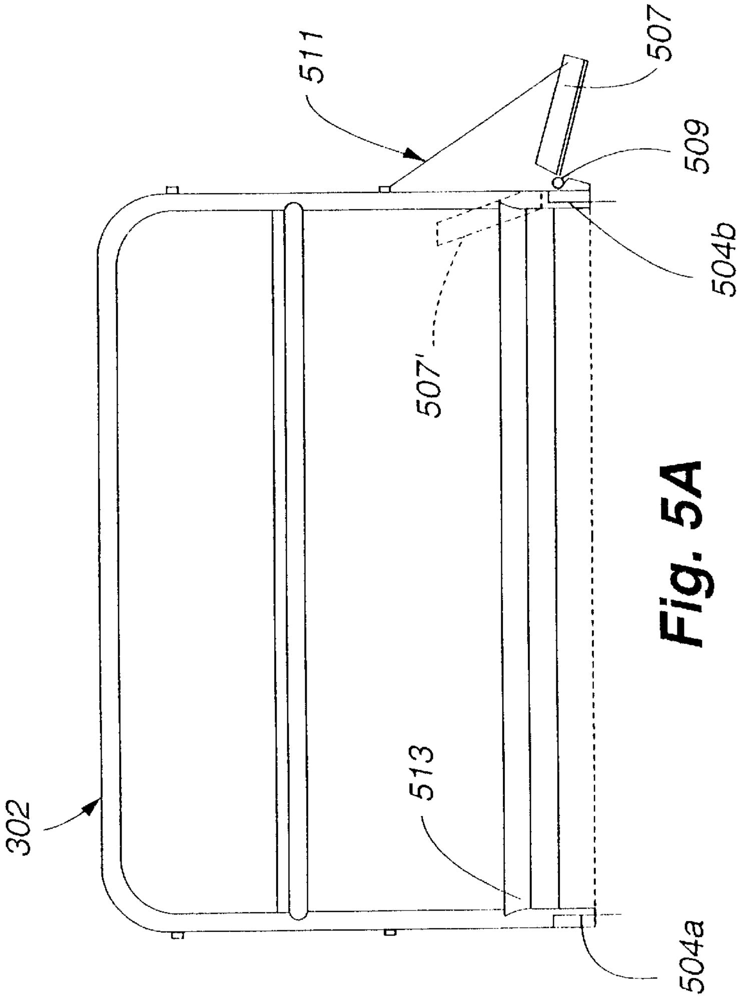

In the embodiment depicted in FIG. 5, handrails 502 are provided for coupling to the lift table by coupling rail ends 504*a*, 504*b*, 504*c*, 504*d*, by inserting in upper plate pockets 404*a*, 404*b*, 404*c*, 404*d*, respectively. In the depicted embodiment, safety chains 505*a*, 505*b* are coupled between the spaced-apart handrails 502, e.g. by coupling to rings welded thereto, e.g. using swivel snap ends (not shown). A bridge plate 507 is coupled to the upper plate flange, preferably pivotably or otherwise movably coupled, e.g. using a hinge 509 to permit movement from a raised configuration 507' to a lowered configuration 507, possible restrained by a safety chain 511, if desired. The handrails 502 may be fitted with kickplates 513. The device of FIG. 5 can be used in connection with the lift table for a number of functions, for example as a portable loading dock, for overhead maintenance or repair. In use, according to one embodiment, the portable loading dock of FIG. 5 is pushed by hand, e.g. using the lift table castors, to a position at the rear of, e.g. a truck which is to be unloaded such as a typical delivery van. The wheel locks on the castors are set to prevent rolling away from the van. The operator may stand on the deck and ride it up to the proper elevation, either under the control of an assistant or controlled by the operator as he rides (via a remote control device, not shown). The operator will then kick the bridge plate to the lowered position so that it rests on the bed of the van permitting the operator to walk over the bridge into the van and to move a load over the bridge from the van onto the portable loading dock, e.g. using a standard hand truck, or using a pallet jack. Once the load was placed on the portable loading dock, the lift table drive/control can be used to lower the portable loading dock and the supported load and the operator can push the loaded loading dock, using the lift table castors, to the desired location. Although the handrails 502 believed to be particularly desirable when the portable loading dock will be used for transporting people, the portable loading dock, such as with the bridge plate, can be used without the handrails, e.g. to receive a load with a width greater than the distance between the handrails 502. Thus, the portable loading dock with a bridge plate could be used for loading pallets or other wide loads onto or off of flat bed type trucks using a conventional pallet jack.

Figure 6B:
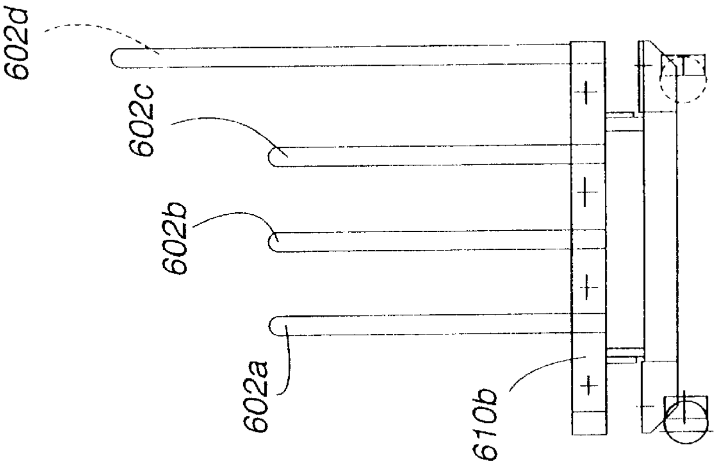
FIGS. 6A and 6B depict side and front elevational views of an improved lift table with panel handling apparatus, according to an embodiment of the present invention.
Figure 6A:
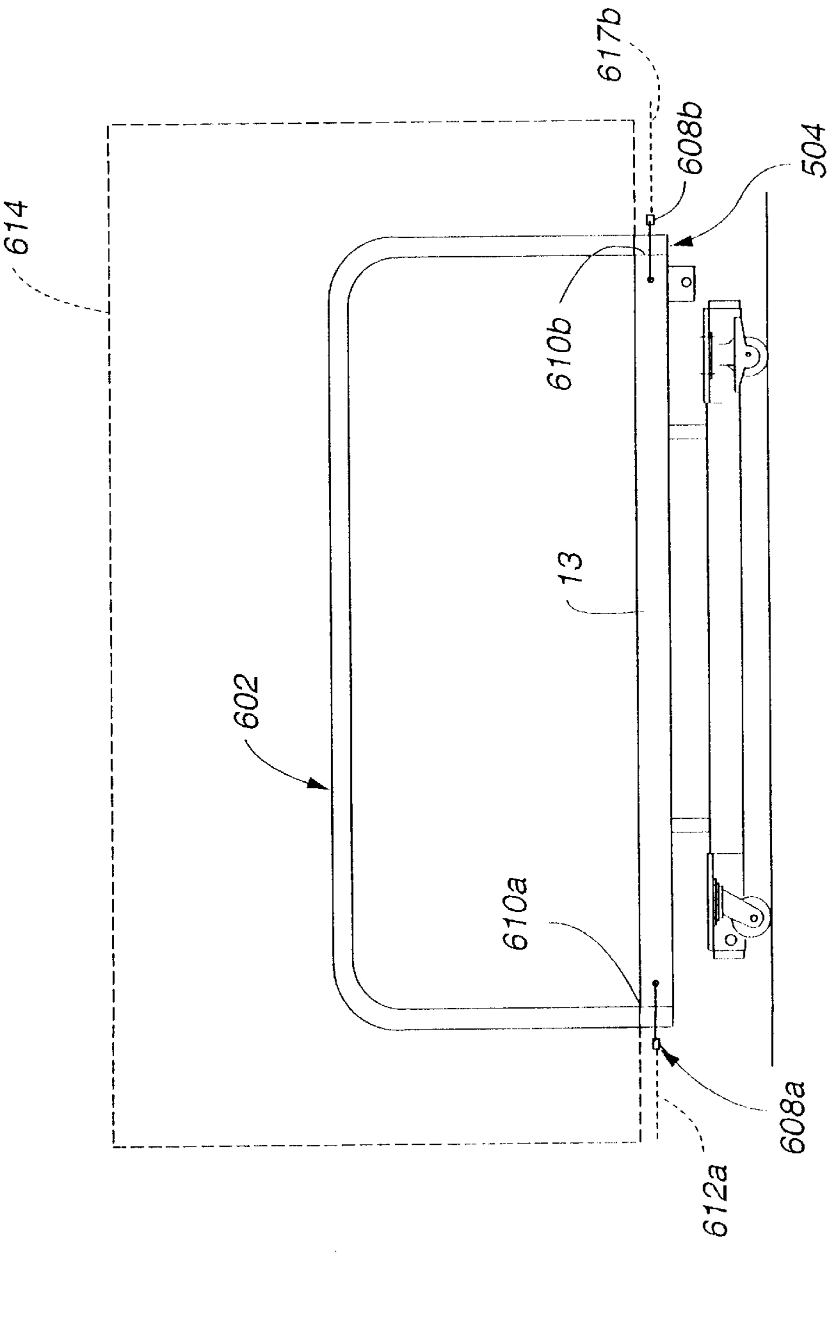
Figures 7A, 7B, 8A, 8B:
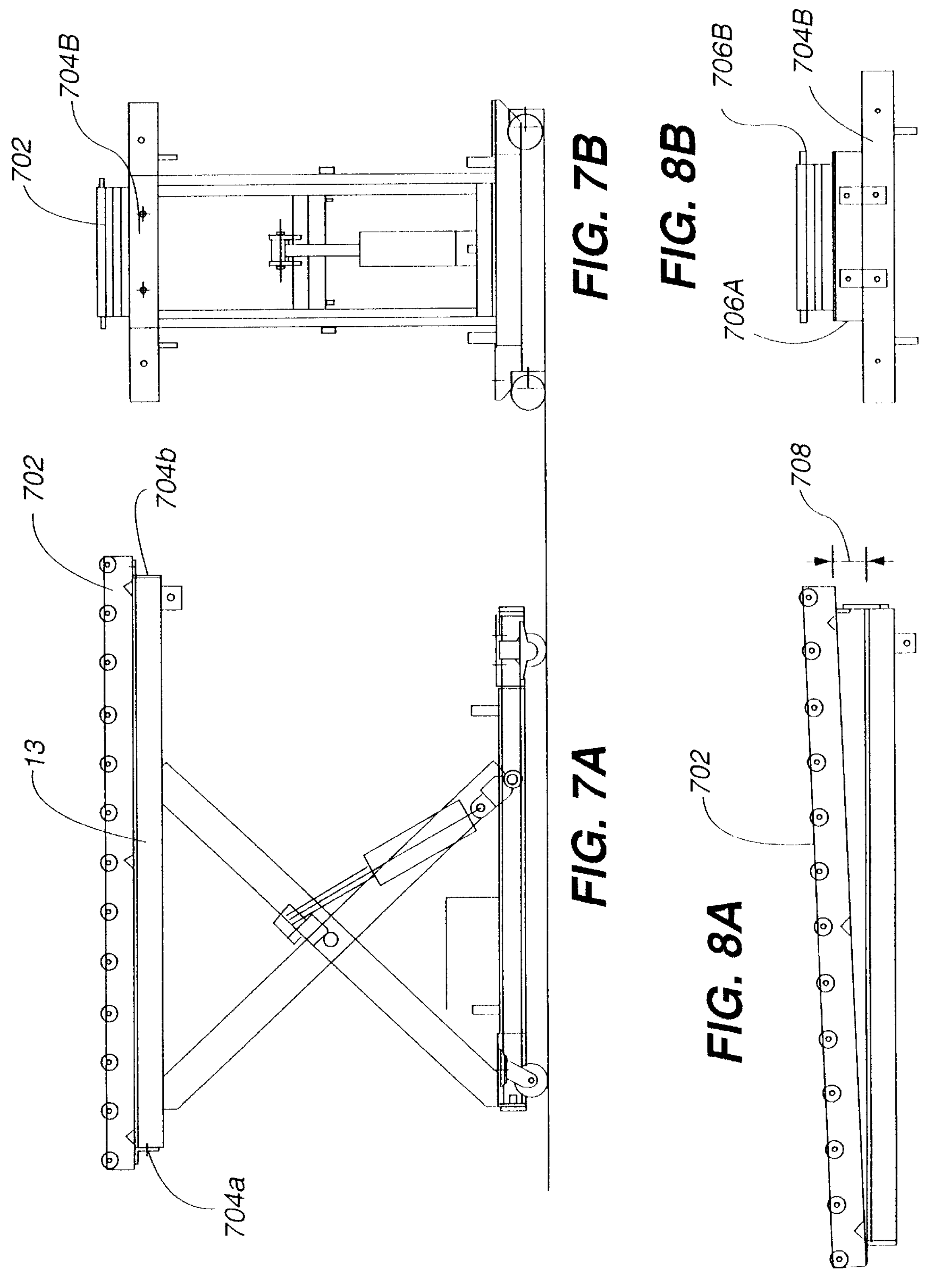
FIGS. 7A and 7B are side and front views of a lift table with a roller conveyor, according to an embodiment of the present invention.
FIGS. 8A and 8B are side and front views of an inclined roller conveyor, coupled to a lift table upper plate, according to an embodiment of the present invention.

In the embodiment depicted in FIG. 6, dividers 602 are coupled to the lift table by coupling divider ends 504 by bolting 608*a*, 608*b* to the end flanges 610*a*, 610*b* of upper plate 13. Through holes found along axes 612*a*, 612*b* at locations selected to position the dividers 602*a*, 602*b*, 602*c*, 602*d*, e.g. as depicted in FIG. 6B. The device in this configuration can be used for loading, lifting and/or transporting sheet or panel materials on edge such as wallboard, plywood, glass, tables, office partitions and the like 614. In use, the dividers 602 are coupled to the lift table, the lift table is pushed adjacent the loading region such as near a truck or van, an elevated loading dock or the like, the sheet material is transferred to the lift table supported in a substantially upright position by the dividers, the table is lowered to its lower position and pushed to the desired unloading location In the embodiments depicted in FIGS. 7A and 7B, a roller conveyor 702 is coupled to the upper plate 13, which is modified to accommodate attachment of the roller conveyor. In the embodiment depicted in FIGS. 7A and 7B, the accommodation includes providing brackets 704*a*, 704*b*, on the deck 13, for bolting or otherwise coupling to the roller conveyor 702. In the embodiment of FIGS. 8A and 8B, one end of the conveyor 702 is coupled to the bracket 704*b* via straps 706*a*, 706*b*, in order to elevate one end of the roller a predetermined distance 708, such as about 3 inches (about 7 cm), to provide an inclined roller conveyor.

Figure 9B:
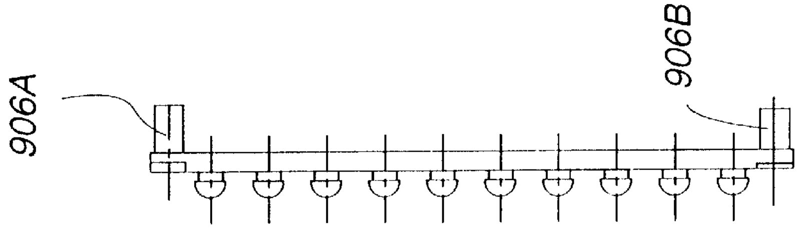
FIGS. 9A and 9B are top plan and end views of a ball transfer device, coupled to a lift deck, according to an embodiment of the present invention.
Figure 9A:
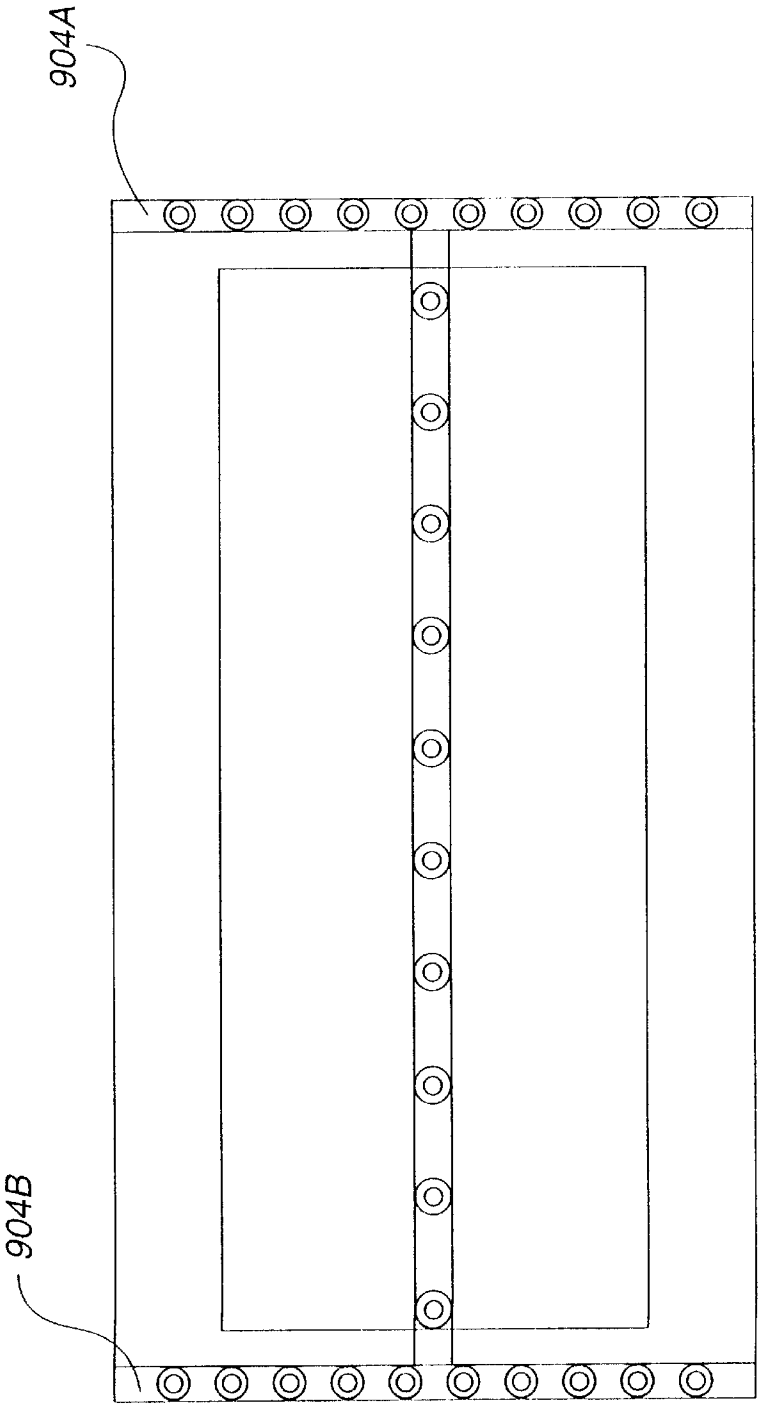

In the embodiment of FIGS. 9A and 9B, ball transfer units are coupled to the upper plates 13. In the depicted embodiment, the ball transfer unit is configured in an H-shape and each end of the parallel bars has 1¼ inch (3 cm)

pipe stubs 906*a*, 906*b* descending therefrom which can be used for coupling the ball transfer device to the deck 13 by inserting the pipe stubs into the deck pockets 404*a*, 404*b*, 4*c*, 404*d*. The ball transfer strips provide for all-direction shifting of sheet or plate stock (such as may be used, e.g., in press break or shear alignment).

Figure 10B:
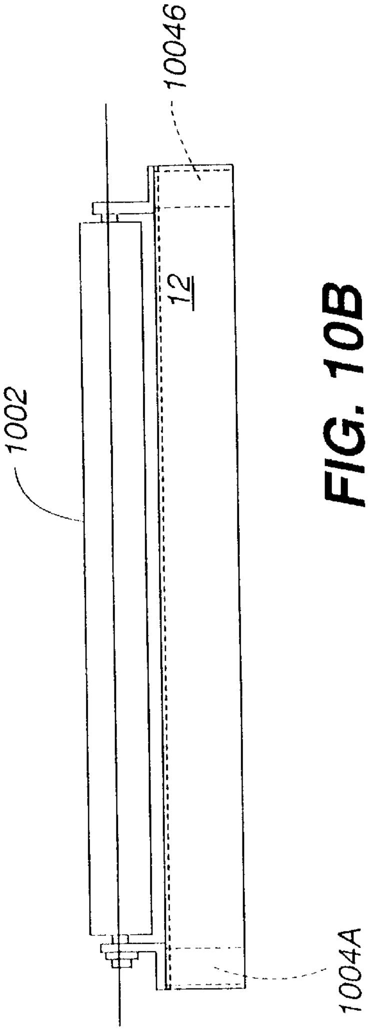
FIGS. 10A and 10B are partial side and end views of a single roller device coupled to an upper plate of a lift table according to an embodiment of the present invention.
Figure 10A:
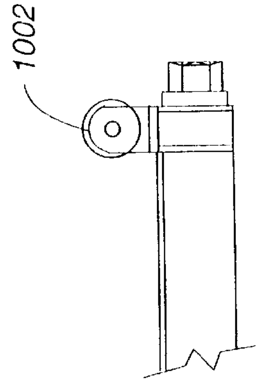
Figure 11:
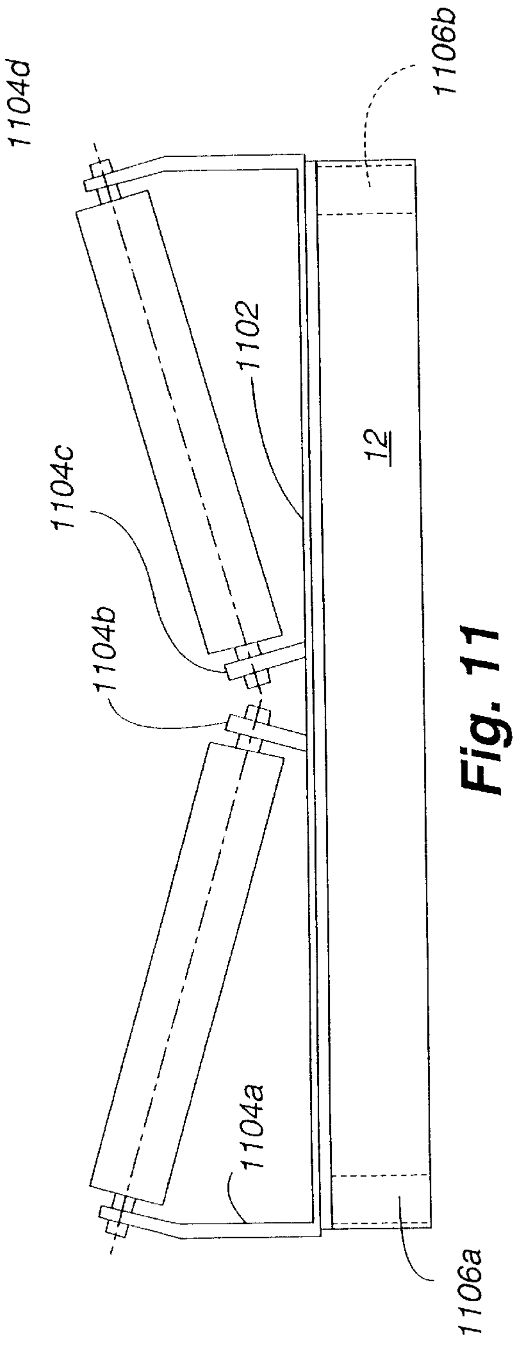
FIG. 11 is an end view of a V-roller device, coupled to an upper plate of a lift table, according to an embodiment of the present invention.

In the embodiment of FIGS. 10A and 10B, an end roller 1002 is provided with descending pipe stubs 1004*a*, 1004*b* at either end for insertion in a pair of the deck pockets 404*a*, 404*b*, 404*c*, 404*d* for coupling to the deck 13. In the embodiment of FIG. 11, a pair of end mounted rollers inclined toward each other in a V-shape (e.g. for conveying pipe or other non-planar objects) is provided with a bottom plate 1102 and brackets 1104*a*, 1104*b*, 1104*c*, 1104*d* and descending pipe stubs 1106*a*, 1106*b* for insertion into a pair of upper plate pockets 404*a*, 404*b*, 404*c*, 404*d* and thus coupling to the upper deck 13.

Figure 12:
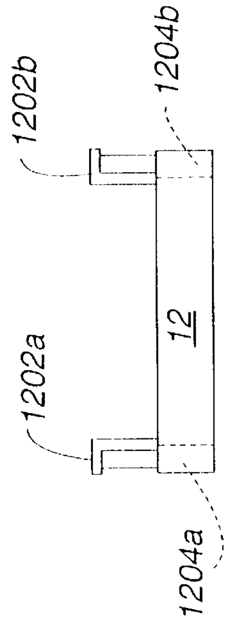
FIG. 12 is an end view of sideboard guides coupled to an upper plate of a lift table, according to an embodiment of the present invention.

In the embodiment depicted in FIG. 12 side bars 1202*a*, 1202*b* are coupled to the upper plate 13 stubs 1204*a*, 1204*b* which can be dropped into or engaged in pockets 404*a*, 404*b*, 404*c*, 404*d*. In one embodiment the sidebars 1202*a*, 1202*b* are made from channel pieces and may have a height 1206 of about 5 inches (about 12 centimeters) and a length of up to about 20 feet (about 6 meters) or more. In one embodiment, a length of 10 feet (about 3 m) is provided. In one embodiment the sidebars are provided with adjustable-position cross ties to configure the lift table for transporting long, thin items such as steel rod, plastic pipe, and, in general, extended flexible items that may not be able to support their own weight, e.g. in a cantilever fashion, without undesirable deformation.

Figure 13:
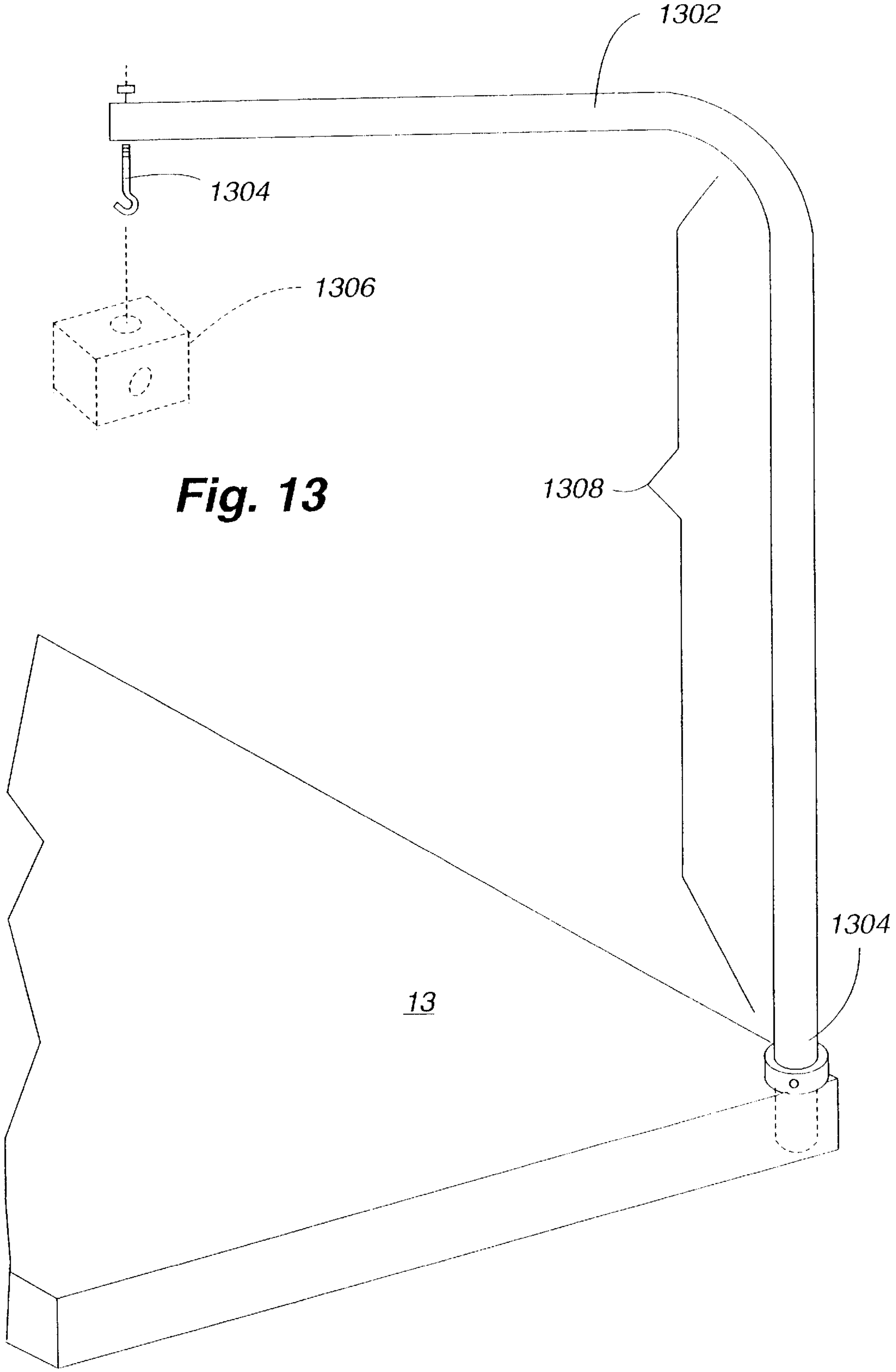
FIG. 13 is a perspective view of an upper plate of a lift table and corner mounted wire feed jib, according to an embodiment of the present invention.
Figure 14A:
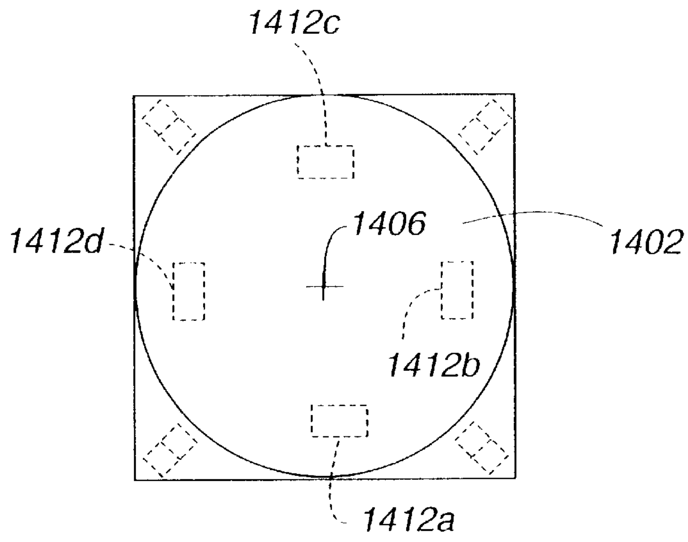
FIG. 14A is a top plan view of an upper plate of a lift table, with a coupled turntable.
Figure 14B:
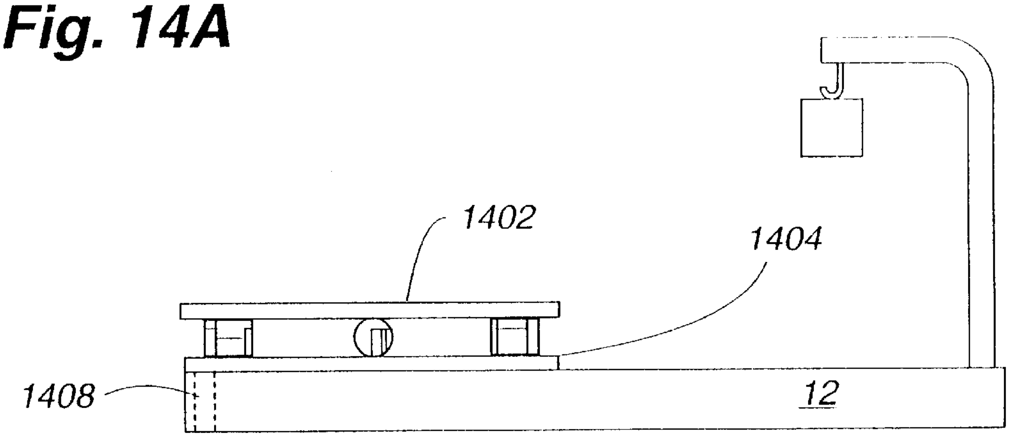
FIG. 14B is a side view of the apparatus of FIG. 14A, with a comer mounted jib.
Figure 14C:
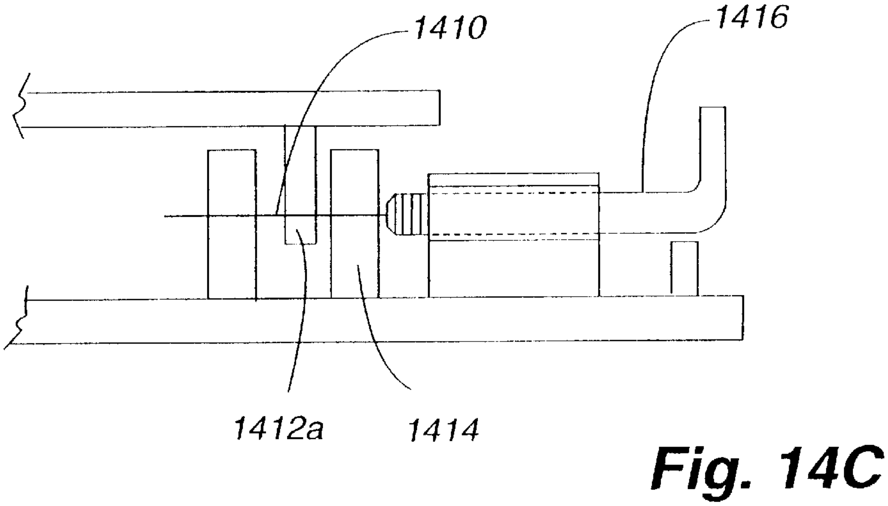
FIG. 14C is a partial side view of the turntable apparatus, and lock device of FIG. 14B.

In the embodiment depicted in FIG. 13, a jib 1302 is coupled to the upper deck 13, e.g. via reception of the lower portion 1304 of the jib in a table pocket, 404*a*, 404*b*, 404*c*, 404*d*. In the depicted embodiment, the jib 1302 is provided with a J-bolt 1304 for suspending a device above the surface of the table 13. In the depicted embodiment the device 1306 is a wire feed welding unit. The jib 1302 can be configured with a plurality of different heights such as about 40 inches (about 100 centimeters) 1308, or can have an adjustable height. Other devices which may be supported by the jib include, e.g. a light fixture, an exhaust hood, test equipment, an automatic glue dispenser or a parts dispenser. Such a suspended jib is particularly useful in conjunction with a turntable (FIGS. 14A, 14B, 14C) e.g. for assembly work.

In the embodiment of FIG. 14 a rotation device including a turntable 1402 coupled to a base 1404 pivotable about an axis 1406 is provided. In one embodiment the turntable is secured to the lift deck by its own weight via the two attached pipe stubs or pins aligned with the deck pockets. In the depicted embodiment the turntable 1402 may be latched in a fixed rotational position via a pin 1410 which is insertable and retractable through holes in lugs 1412*a*, 1412*b*, 1412*c*, 1412*d* when aligned with holes in flanges 1414 via a spring-loaded handle 1416, e.g. for locking at 90° increments.

The above described embodiments provide several examples of ways in which the improved lift table, having a configuration such as corner pockets 404*a*, 404*b*, 404*c*, 404*d*, brackets 302*a*, 302*b*, flanges 610*a*, 610*b* and connecting accommodations such as holes, at predetermined locations 306, 612, can provide for multiple functions of the lift table by user-reconfiguration, i.e. without requiring special tools or training. Thus, brackets 302*a* 302*b* can be used to accommodate tines of a fork, brackets 704*a*, 704*b* can be attached to a deck flange by a simple bolt-on procedure to accommodate a flat roller conveyer (FIGS. 7A, 7B) or inclined conveyor (FIGS. 8A, 8B), corner pockets 404*a*, 404*b*, 404*c*, 404*d* can be used to accommodate a variety of handles 402, transfer rollers (FIG. 9) end rollers (FIGS. 10A, 10B, 11) sideboards or guides (FIG. 12) jibs (FIG. 13) turntables (FIGS. 14A, 14B, 14C) and the like, by a simple drop in procedure (with latching and/or indexing, if desired). Preferably the same coupling devices (pockets, brackets, flanges and connecting accommodations or other devices) which are used for attaching a first type of attachment or apparatus also accommodate a variety of different apparatus for achieving additional functions which are configured with a predetermined spacing for attachment using the coupling devices. When the additional function involves vertical movement or lifting, the lifting feature of the additional function can be achieved, at least in some embodiments, by the lift table driver 16 without requiring an additional driver device, as depicted, e.g., in FIGS. 3A, 3B and 4A, 4B, 4C. Preferably the device is constructed such that when the attachments are added, the resulting device will be configured in a predetermined and useful shape such as providing fork tines with a spacing configured to standard pallet sizes.

Another embodiment which makes effective use of the lift table drive device 16 e.g. to reduce or eliminate the need for additional driver or lifting devices and which is also able to provide certain functionality not effectively available in previous devices, is a tilter/layover attachment as depicted in FIGS. 15A–F and 16. The tilter/layover device is intended to move a load from a first (e.g. vertical) orientation to a second (e.g. angled or horizontal) orientation. In some tilt devices, auxiliary hydraulic cylinders or other drivers and/or valving are used to perform the tilting function. In some devices, a auxiliary deck is hinged along an end edge or a side edge of a lift table upper deck or plate. In particular, having an edge of the auxiliary table coupled to an edge of the lift table plate or deck. In some devices, deck tilt is limited to 45°, often because further tilting would require additional counter balance valving to prevent the load from over-running the cylinder stroke. In some cases, double acting cylinders, and/or extra valving are needed in order to return the deck to its original position. Such a configuration can easily lead to a tilt/layover device which is more expensive than a lift table. Some or all of these difficulties are overcome by the configuration depicted in FIGS. 15A–F and 16, which is additionally useful because it may be coupled to a lift table in a manner which is user-couplable and consistent with interchangability with other types of attachments. In the depicted embodiment the tilter/layover attachment is coupled to the upper plate of the lift table 13 via a descending pin, post or pipe stub 1516 which may be received in a pair of upper plate pockets 404*a*, 404*b*, 404*c*, 404*d*. In the depicted embodiment, the tilter/layover includes a first support frame or plate 1502 and, preferably, a plate, fork or frame 1504 extending therefrom, e.g. at about 90 degrees. In one embodiment of the tilt deck is substantially square in shape, e.g. 48 inches (120 centimeters) on the side and the plate 1504 has a length 1514 of about 8 inches (about 20 centimeters). The plate 1504 may be attached to the tilt plate 1502 e.g. by welding, bolting and the like.

In the depicted embodiment the tilt plate 1502 is pivotally coupled to the lift table deck 13 at a position which is spaced 1506 from an edge 1508 of the tilt plate 1504. In one embodiment, the spacing 1506 is about 19⅛ inch (about 48.5 cm). Positioning of the pivot axis spaced from an edge of the tilt plate assists in positioning a center of gravity of the load 1510 in such as way as to make movement and tilting of the load easier, particularly positioning the center of gravity closer to the pivot point. A chain or linkage 1512 is coupled between an end of the tilt deck 1502 and the base or frame 14 of the lift table. As described below, the lift table vertical travel is used to cause the chain or linkage 1512 to rotate the tilt deck 1502 through any required angle up to 90°.

Figure 15B:
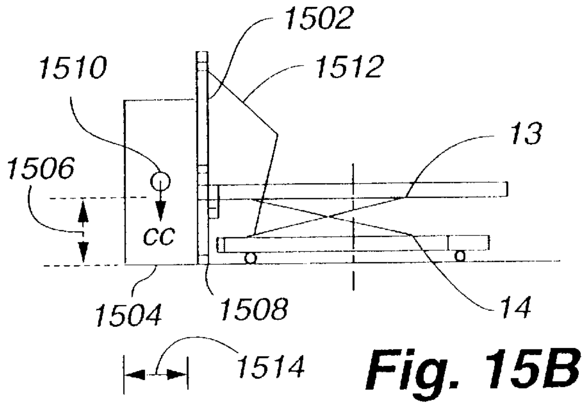
FIGS. 15A through 15F are side views of a lift table with a tilter device, showing use thereof.
Figure 15A:
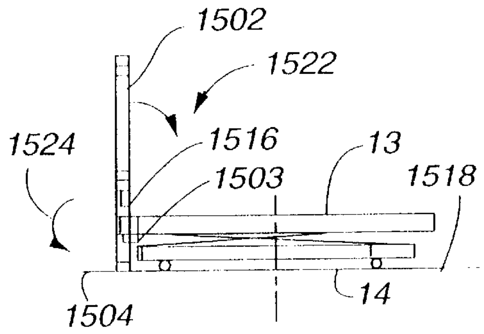
Figure 15D:
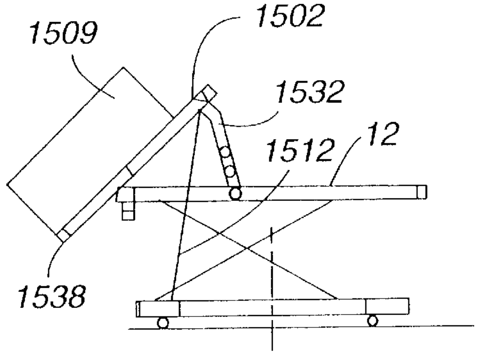
Figure 15C:
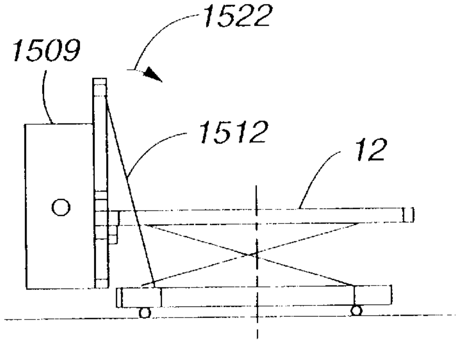
Figure 17B:
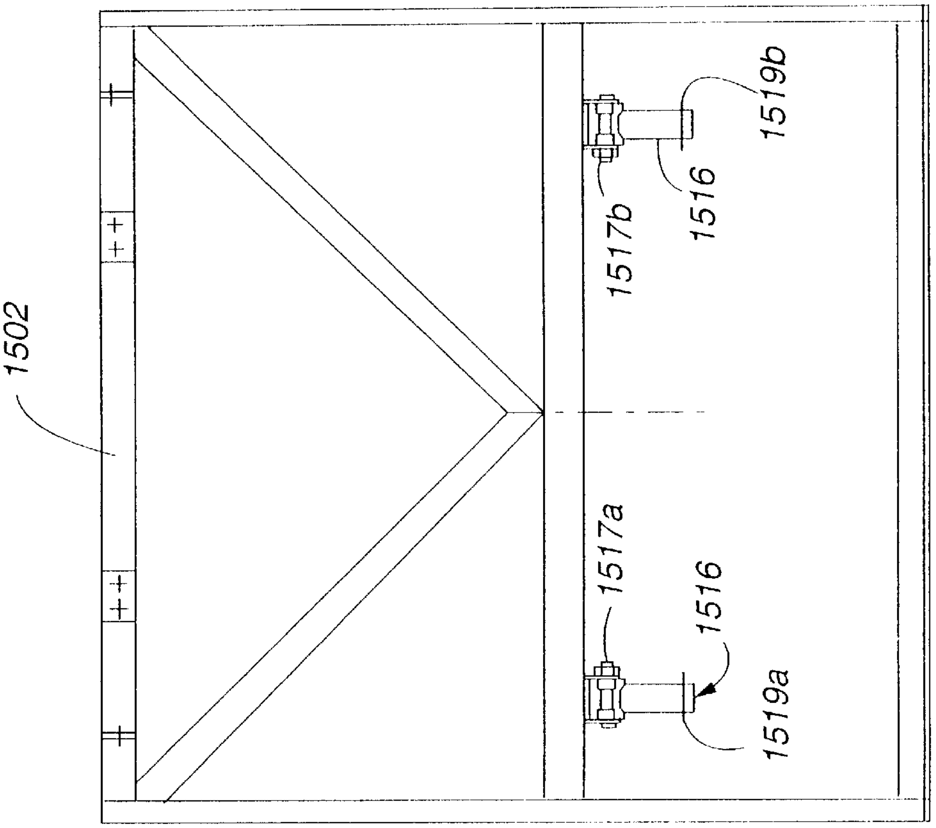
FIG. 17B is a bottom plan view of a tilt plate according to an embodiment of the present invention.
Figure 17A:
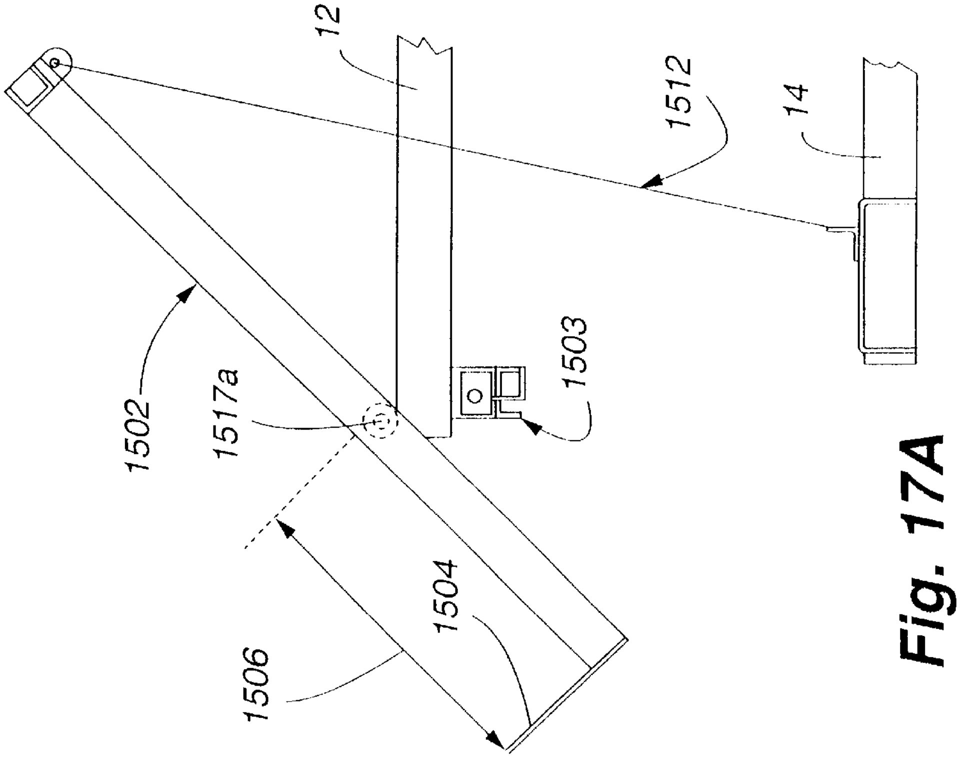
FIG. 17A is a partial side view of a lift table with a tilter device, according to an embodiment of the present invention.

As depicted in FIG. 15A the tilt table 1502 may be attached to the lift table in the following manner. Pipe stubs 1516 are pivotally coupled to the tilt plate 1502 and positioned to be aligned with pockets in the upper deck 13. In the configuration depicted in FIG. 15A the tilt plate 1502 is in its storage position resting on the plate 1504. The lift table, with the upper deck 13 in a lowered position, is pushed laterally to the tilt plate 1502 so that the hinged pipe stubs 1516 line-up over the corner pockets of the upper deck 13, as depicted. The pipe stubs 1516 are coupled to the tilt plate 1502 so as to pivot about collinear axes 1517*a*, 1517*b* (FIGS. 17A, 17B). The upper deck 13 is then elevated, using the drive 16 so that the hinge stubs engage into the deck pockets. Further elevation lifts the plate 1504 off the surface 1518 and the tilt plate is then easily rotated by hand 1522 to a horizontal position if desired. The hinge stubs may be secured by bolts or pins at the under side of the upper deck 13 inserted through holes formed in the pipe stubs 1516, along axes 1519*a*, 1519*b*, e.g. to prevent them becoming disengaged if the lift is lowered to the extreme down position. In one embodiment, with the tilt plate 1502 in the horizontal position, a stop device 1503 (FIG. 15G) is attached, e.g. to the brackets or frame lugs 302*a*, 302*b* to contact the tilt plate 1502 when it is moved to the vertical position and prevent the plate from being rotated 1524 past the vertical position (FIG. 15A).

As depicted in FIG. 15B the chain or linkage 1512 is attached, e.g. by attaching to both sides of the tilt plate from lugs coupled to the end of the tilt deck 1502 and to brackets on the bottom frame or shelf 14. In the configuration depicted in FIG. 15B the chain or linkage 1512 is slack or unstressed. When the upper deck 13 is raised, using the drive 16, the load 1509 is lifted and eventually the slack in the chain or linkage 1512 is taken up so that the chain or linkage is in tension. If the load 1509 is too heavy to be lifted, the lift table will tilt, lifting one set of wheels or castors off the support 1518. Raising the lift table upper deck 13 past the position depicted in FIG. 15C causes the tilt plate 1502 to begin rotating 1522, with the amount of rotation increasing as the deck 13 increases. In the embodiment depicted in FIG. 15D the upper deck 13 has been raised to position the plate 1502 (and attached load 1509) in a position which is about 45 degrees from the vertical. An adjustable length link 1532 may be attached between the tilt plate 1502 and the upper deck 13, e.g. by bolting to a side flange of the upper deck 13, preferably on both sides. This can be used to secure the plate 1502 in any desired angle, once that angle has been achieved by positioning the upper deck 13. After the tilt plate 1502 is secured in the desired angle the upper deck 13 may be lowered, slackening the chain or link 1512 which may be then removed if desired, e.g. so that the upper deck 13 may be elevated to a desired height.

Figure 15F:
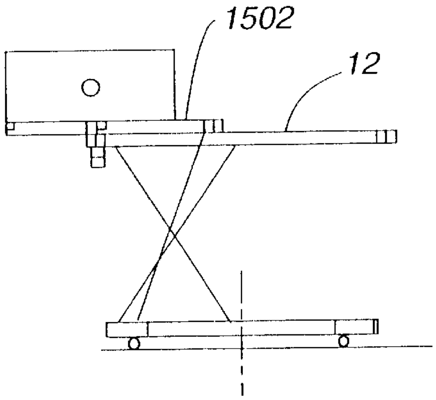
Figure 15E:
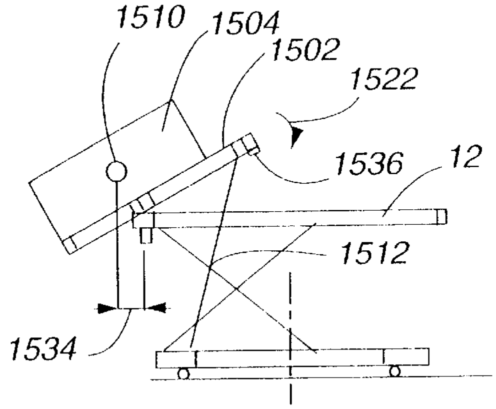
Figure 15G:
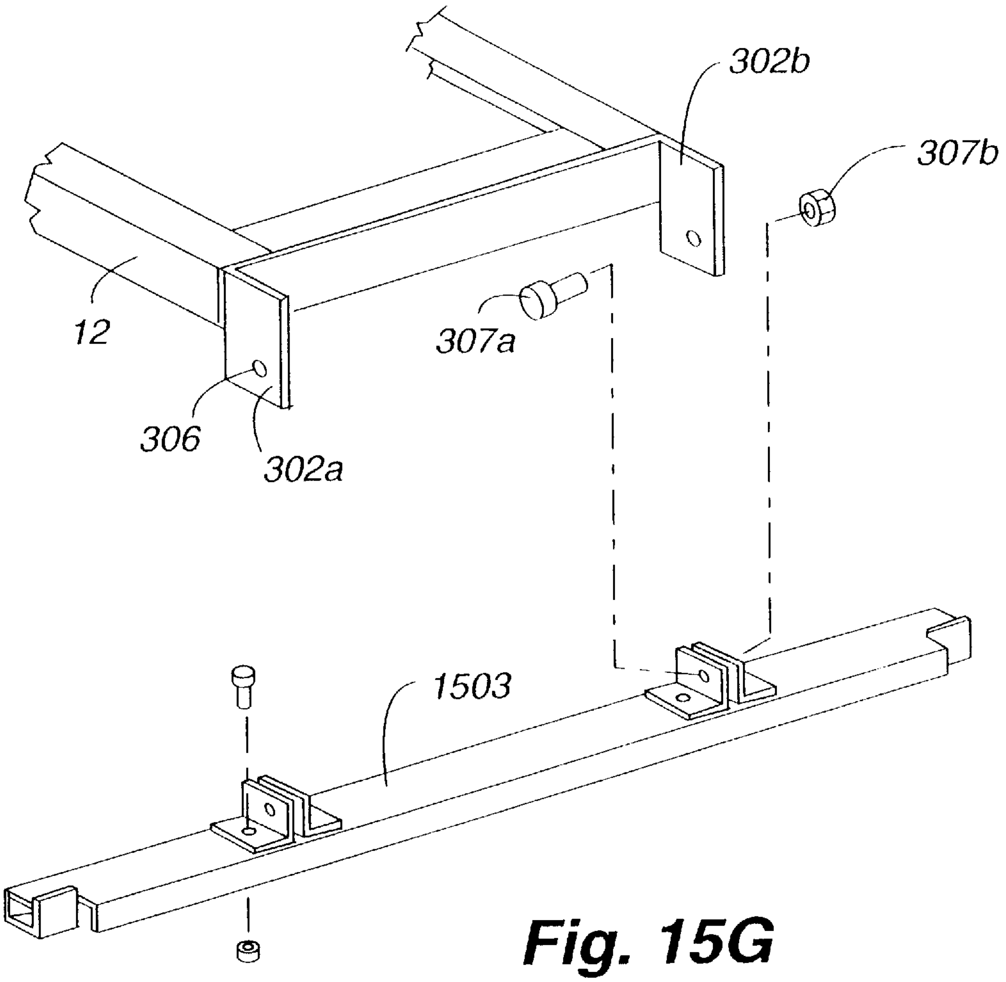
FIG. 15G is a partial exploded perspective view showing attachment of a stop device to an upper frame.

In the configuration depicted in FIG. 15E the upper deck 13 has been raised to a position in which the tilt plate 1502 is at an angle of about 60° to the vertical. In the embodiment depicted, the center of gravity 1510 is spaced 1534 from the pivot point or axis and thus the chain or linkage 1512 is still under tension. This, of course, will change depending on the location of the center of gravity 1510 with respect to the load 1509. In the case of a load having its center of gravity rotated behind the pivot point, the plate 1502, at that time, will rotate down 1522 to rest in a horizontal position. If desired, rubber shock pads 1536 or similar shock absorbing devices may be positioned on the under side of the plate 1502. FIG. 15F depicts a situation in which the plate 1502 has been fully rotated to the horizontal position. If desired, the tilt plate 1502 may be secured in this position adjacent the lift table top deck 13. The deck 13 may now be lowered to any desired height.

Figure 16:
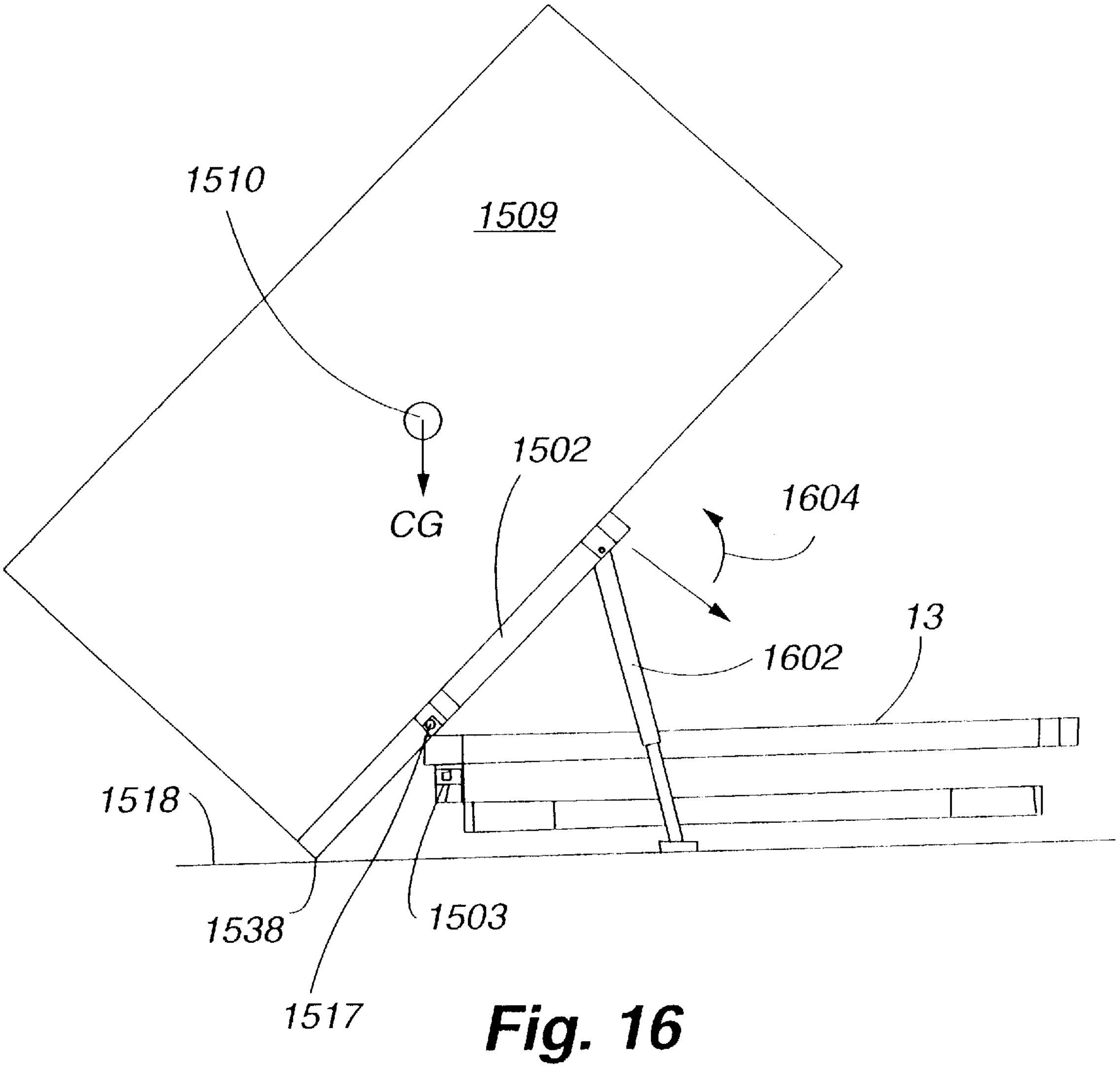
FIG. 16 depicts a lift table and tilter device with an extended leg.

The apparatus can also be used in other fashions. For example, it can be used to lay over a large object from a horizontal position, such as that depicted in FIG. 15F to e.g. a 45° tilt position. For this purpose, the tilt plate 1502 is first secured in a horizontal position adjacent the upper deck 13. The upper deck 13 is adjusted in elevation to accommodate loading of the object, such as positioning to the height of a loading dock, tailgate, shelf, etc. Preferably the caster wheels will be locked to prevent movement of the table. The object is then positioned on the tilt plate 1502 adjacent the 90° plate 1504 and may be held in place with respect to the tilt plate 1502 using appropriate straps or tie downs if desired. The linkage or chain 1512 is removed and the deck 13 is raised to a position sufficiently high to permit attachment of or extension of legs coupled to the upper end of the tilt plate 1502. In one embodiment, the legs are permanently coupled to the plate 1502 in a pivoting self storing configuration. The legs are preferably extendible to define various angles with respect to the tilt table lower edge 1538. After extending the legs so as to define the desired angle, the upper deck 13 is lowered until the legs 1602 contact the support surface 1518 causing the tilt plate 1502 to tilt upward 1604 from the horizontal position until the lower edge 1538 of the tilt plate 1502 contacts the support surface 1518 as depicted in FIG. 16. At this point the load 1509 is in the desired angular configuration of 45° defined by the angle and extent of leg 1602. The tilt plate 1502 may then be secured in this angular position with respect to the table deck 13, e.g. using straps 1532 and, if desired, the leg 1602 may then be removed or stowed and deck 13 lifted, using drive 16, to position the load 1509 in the desired elevation. In the depicted embodiment the load 1509 has a center of gravity 1510 positioned such that it has not over-rotated the pivot axis 1517*a*, 1517*b* by the time it has reached the desired angular configuration shown at FIG. 16. If it is desired to position the load 1509 at an angle such that the center of gravity 1510 is rotated beyond the pivot axis 1517, a hold back device such as a controllable linkage or chains connecting the end of the tilt table 1502 to the deck 13 may be provided. This maneuver requires exercise of extreme caution.

In light of the above description, a number of advantages of the present invention can be seen. The present invention permits a lift table to be used for a number of functions via configurations which can be achieved by the end user without special tools or training. Preferably multiple function attachments can be coupled using the same coupling devices such as pockets, flanges, brackets etc. Preferably some of said additional functions are achieved using the same hydraulic or other drive that is used to lift the upper frame of the lift table.

In one embodiment, the lift table apparatus includes a lower frame, an upper frame, a scissor mechanism connecting the upper and lower frames, an actuator for extending the scissor mechanism (in one case, a hydraulic cylinder), an internally mounted hydraulic pump unit with electric motor driver and remote up and down controller, an upper deck surface bolted to the top frame and casters bolted to the lower frame. In one embodiment the upper deck is removable, e.g. so that the pump unit can be serviced in the collapsed position, such as checking fluid level or replacing hoses. The upper deck can also be replaced by the end user with a different size deck or with a special fixture made to a user's specification. In one embodiment, the casters can be removed by the end user, e.g. if a permanent installation is desired and/or a lower collapsed height is needed. In one embodiment, the collapsed height is about 12.125 inches with casters and about 9.5 inches without. In one embodiment, the lift table improvements can include mounting brackets attached to one end of the upper frame, pockets built-in to the corners of the upper deck surface and/or a flange down on the upper deck surface containing holes at various predetermined locations for attachment of auxiliary devices. An advantage of such improvements is that they enable the end user to reconfigure the lift table to perform other functions by the addition of various auxiliary devices. Examples of functions that can be performed by a lift table with various auxiliary devices include transport of various materials by pushing the entire portable unit over a level surface by hand, lifting material through a range of elevations, conveying material across the deck at the required elevation, tilting material about a horizontal axis, turning material about a vertical axis and/or loading material to/from, e.g., delivery vehicles at various elevations.

A number of variations and modifications of the invention can be used. It is possible to use some aspects of the invention without using others. For example it is possible to configure the lift table to accommodate a tilt device (FIG. 15) and turntable (FIG. 14) without providing a fork lift function. In some cases, several embodiments can be used at the same time. Some examples of useful combinations of attachments include combining a handle 402 with forks 22, a handrail 502 with the bridge plate 507, handrails 502 with panel dividers 602, conveyor 702 with backstop 402, turntable 1402 with jib 1302, bridge plate 507 with the backstop 402, tilter (FIGS. 15–16) with roller (FIGS. 10 and/or 11), tilter (FIGS. 15–16) with handle 402 and/or tilter (FIGS. 15–16) with adjacent turntable 1402. Other combinations are also possible and attachments and functions in addition to those depicted and described can also be provided. Although a hydraulic driver has been depicted, other drivers can be used, including electric or internal combustion motors or engines, a battery-powered hydraulic pump unit, pneumatic devices, linear actuators or combinations thereof. Other attachments for performing other functions can also be provided, such as a drum or barrel-handling cradle or tilter. Although the depicted embodiment depicts only a singe hydraulic cylinder, it is also possible to provide two or more hydraulic cylinders coupled to elevate the upper support with respect to the lower frame. Preferably, there is only a single control and power circuit, even when there are multiple cylinders. Thus, when a second function is performed using the same motive device that is used for elevating the upper support of the lift table, the single control and power circuit is used for providing control and power for such second function, thus avoiding duplication of components. Although specific types of attachments have been depicted and described as being used in coupling specific attachments to a lift table, it is possible to use coupling devices described for one type of attachment in connection with another type of attachment. For example, although in the depiction of FIG. 3, the forks are attached to the top frame, a suitably reinforced deck could be used to support the fork tines. Although the depicted embodiment shows a single scissors lift linkage, other types of lift devices can also be used including a double scissors mechanism (e.g. for increasing lift height without changing the standard table length), a single or double knee lift which may use one or more pairs of scissor arms for stabilizing the deck and keeping it in a level plane as it travels up, a cam lift mechanism that raises the deck with a pair of lifting arms anchored to the end of the base frame and having rollers on the opposite ends, possibly with scissor arms for guiding the deck up in a level plane and/or a cam mechanism using screw actuators, rather than hydraulic actuators, possibly incorporating the lift arm as part of the scissors stabilizing mechanism. Other lifting mechanisms for lift tables include airbags, vertical screws, a "slinky" mechanism, roller screw lifts and ball screw lifts.

Although the invention has been described by way of preferred embodiments and certain variations and modifications other variations and modifications can also be used, the invention being defined by the following claims:

What is claimed is:

1. An improved lift table apparatus, comprising:

lower support means;

upper horizontal support means;

a single lift drive means for positioning said upper horizontal support means at a desired elevation, wherein said lift drive means is selected from the group consisting of a hydraulic cylinder, a hydraulic actuator, a screw actuator, an airbag, a vertical screw, a roller screw, a ball screw, an electric motor, an internal combustion motor, a pneumatic drive and a linear actuator;

a linkage means, different from said single lift drive means, coupling said lower support means to said upper support means;

means permitting an end-user to couple either of at least first and second attachments to said upper horizontal support means, in an easily detachable manner, for performing first and second different functions, respectively, using said single lift drive means without the need for a second lift drive means;

wherein said means permitting an end user to couple attachments in an easily detachable manner includes a fixture selected from the group consisting of pockets and brackets, said means permitting an end user to couple attachments being provided in said horizontal support means; and wherein said fixture is used to permit an end-user to couple said first attachment and said fixture is also used to permit an end-user to couple said second attachment, in an easily detachable manner.

2. Improved lift table apparatus, as claimed in claim 1, wherein said first function is selected from the group consisting of a forklift function, a horizontal conveyor function, an inclined conveyor function, a turntable function, a tilt function, a portable loading dock function, and a push cart function.

3. A method for using a lift table, said lift table configured to perform a lift table function of vertically lifting a load supported on a horizontal upper support of said lift table, the method comprising the steps of:

providing a lift table having at least a lower support and a single lift drive extendably coupled with respect to said horizontal upper support wherein said lift drive means is selected from the group consisting of a hydraulic cylinder, a hydraulic actuator, a screw actuator, an airbag, a vertical screw, a roller screw, a ball screw, an electric motor, an internal combustion motor, a pneumatic drive and a linear actuator;

providing a first coupler on said upper support, wherein said first coupler is selected from the group consisting of pockets and brackets provided in said horizontal upper support;

coupling a first auxiliary apparatus to said horizontal upper support, in an easily detachable manner, using said first coupler, in the absence of special tools or training, said first auxiliary apparatus configured to perform a first function different from said lift table function using said single lift drive without the need for a second lift drive;

removing said first auxiliary apparatus in the absence of special tools or training; and coupling a second auxiliary apparatus to said upper support, in an easily detachable manner, using said first coupler, in the absence of special tools or training, said second auxiliary apparatus configured to perform a second function different from both said lift table function and said first function using said single lift drive without the need for a second lift drive, wherein the same coupler used in said step of coupling of said first auxiliary apparatus is also used in said step of coupling of said second auxiliary apparatus.

4. An improvement for a lift table device, the lift table having an upper horizontal support positioned above a base and attached by a linkage to said base, a single lift mechanism, different from said linkage, coupled to said linkage for lifting said upper horizontal support, said lift table movable over a surface using a plurality of wheels, the improvement comprising:

said lift mechanism being selected from the group consisting of a hydraulic cylinder, a hydraulic actuator, a screw actuator, an airbag, a vertical screw, a roller screw, a ball screw, an electric motor, an internal combustion motor, a pneumatic drive and a linear actuator;

a pair of substantially parallel forks for performing a forklift function, coupled to said upper support, in an easily detachable manner, by a first coupler selected from the group consisting of pockets and brackets provided in said upper horizontal support wherein said single lift mechanism is configured to simultaneously lift said upper horizontal support and said forks without the need for a second lift mechanism wherein said first coupler is also used to permit an end-user to couple a second attachment to said upper support, in an easily detachable manner, said second attachment being different from said pair of substantially parallel forks, for performing a second function, different from said forklift function.

5. The improvement of claim 4 wherein said table can be lowered to a position wherein said forks are substantially adjacent said surface.

6. The improvement of claim 5 wherein said forks are positioned below an upper surface of said upper support.

7. The improvement of claim 4 wherein said forks are detachably coupled to said upper support.

8. The improvement of claim 4 wherein said forks are pivotably coupled to said upper support.

9. The improvement of claim 4 wherein said forks can be moved between a first operable position extending outward from said deck to a second storage position at least partially in line with said upper support.

10. The improvement of claim 4 wherein said forks, when in an operable configuration are laterally moved, with respect to said surface, by moving said lift table using said plurality of wheels.

11. The improvement of claim 4 wherein said upper horizontal support defines a plane and said single lift mechanism is angled with respect to a perpendicular to the plane of said upper support.

12. The improvement of claim 4 wherein said single lift mechanism includes only a single power and control circuit.

13. The improvement of claim 4 wherein the lateral spacing of said forks is substantially fixed.

14. The improvement of claim 4 wherein the upper surface of said forks are below an upper surface of said upper support.

15. The improvement of claim 4 wherein said linkage is a scissors-type linkage.

16. An improvement for a lift table device, said lift table having a base, said lift table configured to perform a first lift table, function of vertically lifting a load supported on an upper horizontal support of said lift table, said lift table having a single lift mechanism, different from a linkage between said base and said upper horizontal support, said lift mechanism coupled to said linkage for lifting said upper horizontal support, said lift table movable over a surface using a plurality of wheels, the improvement comprising:

said lift mechanism being selected from the group consisting of a hydraulic cylinder, a hydraulic actuator, a screw actuator, an airbag, a vertical screw, a roller screw, a ball screw, an electric motor, an internal combustion motor, a pneumatic drive and a linear actuator;

a first attachment configured to perform a second function different from said first, lift table, function, said first attachment being removably coupled to said upper horizontal support, in an easily detachable manner, by a first coupler wherein said single lift mechanism is configured to simultaneously lift said upper horizontal support and said attachment without a need for a second lift mechanism wherein said first coupler is selected from the group consisting of pockets and brackets provided in said horizontal support; and wherein said first coupler is also used to permit an end-user to couple a second attachment to said upper support, in an easily detachable manner, said second attachment being different from said first attachment for performing a second function, different from said second function.

17. The improvement of claim 16 wherein said first attachment comprises a pair of substantially parallel fork tines.

18. The improvement of claim 16 wherein said first attachment comprises a layover device.

19. The improvement of claim 16, wherein said first attachment comprises a conveyor.

20. A combination lift table and second function apparatus comprising:

a lift table having an upper horizontal frame positioned above a base, said lift table configured to perform a first, lift table, function of vertically lifting a load supported with respect to said upper horizontal frame of said lift table;

linkage means for attaching said upper frame to said base;

first means to perform a second function different from said first, lift table, function, said first means being removably coupled to said upper horizontal frame, in an easily detachable manner, by a first coupler wherein said first coupler is selected from the group consisting of pockets and brackets provided in said upper horizontal frame;

wherein said first coupler is also used to permit an end-user to couple a second attachment to said upper support, in an easily detachable manner, said second attachment being different from said first means, said second attachment for performing a third function, different from said first and second functions.

a single lift means coupling said base to said linkage for substantially simultaneously lifting said upper frame and said first means without the need for a second lift means, said lift means being different from said linkage means, wherein said lift means is selected from the group consisting of a hydraulic cylinder, a hydraulic actuator, a screw actuator, an airbag, a vertical screw, a roller screw, a ball screw, an electric motor, an internal combustion motor, a pneumatic drive and a linear actuator; and wheel means for laterally moving said lift table and first means as a unit.

21. The combination of claim 20 wherein said first means comprises fork means.

22. The combination of claim 20 wherein said first means comprises a layover means.

23. The combination of claim 20 wherein said first means comprises a conveyor means.

24. The combination of claim 20 wherein said first means comprises a turntable means.

25. A method for reversibly configuring a lift table by an end user for moving a load comprising:

providing a lift table having an upper deck surface coupled to an upper horizontal frame positioned above a base and attached by a linkage to said base, a single lift mechanism, different from said linkage, and coupled to said linkage for lifting said deck, wherein said lift drive means is selected from the group consisting of a hydraulic cylinder, a hydraulic actuator, a screw actuator, an airbag, a vertical screw, a roller screw, a ball screw, an electric motor, an internal combustion motor, a pneumatic drive and a linear actuator, said lift table movable over a surface using a plurality of wheels;

coupling, by said end user, a pair of substantially parallel forks to said upper frame, in an easily detachable manner, using a first coupling device on said frame, to extend beyond said deck for performing a forklift function, wherein said first coupling device is selected from the group consisting of pockets and brackets provided in said horizontal support means; and adjusting the height of said lift table to position said forks at a level substantially at or below the level of said load;

moving said lift table and said attached forks to position said forks substantially below said load;

using said single lift mechanism to simultaneously lift said deck and said forks, carrying said load without the need for a second lift mechanism;

using said wheels to move said load to a desired location;

lowering said deck to lower said load to said surface;

moving said lift table and said attached forks to retract said forks from below said load;

decoupling said forks from said lift table, by said end user; and using said first coupling device by an end-user to couple a means for performing a second function, to said upper frame, in an easily detachable manner, said means for performing a second function being different from said pair of substantially parallel forks, said second function being different from said forklift function.

* * * * *